(12) United States Patent
Gissler

(10) Patent No.: US 6,349,767 B2
(45) Date of Patent: *Feb. 26, 2002

(54) DISCONNECT TOOL

(75) Inventor: Robert W. Gissler, Spring, TX (US)

(73) Assignee: Halliburton Energy Services, Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,964

(22) Filed: May 13, 1998

(51) Int. Cl.[7] .................. E21B 17/14; E21B 17/02; F16L 35/00; B25G 3/00
(52) U.S. Cl. .................. 166/242.6; 166/384; 166/385; 285/2; 403/316; 403/331
(58) Field of Search .................. 166/242.2, 242.6, 166/380, 384, 385, 378; 285/2; 403/316, 331

(56) References Cited

U.S. PATENT DOCUMENTS

| | | | |
|---|---|---|---|
| 2,701,614 A | 2/1955 | Ragan et al. | 166/63 |
| 2,770,308 A | 11/1956 | Saurenman | 166/65 |
| 2,978,029 A | 4/1961 | O'Reilly | 166/63 |
| 3,990,765 A | 11/1976 | Hill | |
| 4,124,070 A | 11/1978 | King et al. | 166/255 |

(List continued on next page.)

FOREIGN PATENT DOCUMENTS

| | | | | |
|---|---|---|---|---|
| FR | 2306782 | 4/1976 | | B23P/11/02 |
| GB | 482293 | 9/1936 | | |
| GB | 1488393 | 10/1977 | | F16L/21/00 |
| GB | 1548964 | 7/1979 | | F16B/19/08 |
| GB | 2310872 A | 9/1997 | | |
| WO | WO 98/14685 | 4/1998 | | |

OTHER PUBLICATIONS

Antech, Ltd.; "*Colt 288 Modular Sensor String for Coiled Tubing*" Sales Brochure; pp. 1–4; Unknown.
Antech, Ltd.; "*Coiled Tubing Logging Head*" Sales Brochure; p. 1; Jan. 1998.
Antech, Ltd.; "*Logging Head/Electrical Release*" Technical Specification; pp. 1–3; 1997.

(List continued on next page.)

*Primary Examiner*—Roger Schoeppel
(74) *Attorney, Agent, or Firm*—William M. Imwalle; Marlin R. Smith

(57) ABSTRACT

A disconnect tool includes a housing that has a first segment and a second segment. A first collet is coupled to the first segment and has a first plurality of fingers, each of the first plurality of fingers is bendable between a first position in which the fingers engage the first segment and prevent relative sliding movement between the first and second segments, and a second position in which the fingers do not engage the first segment and do not prevent relative sliding movement between the first and second segments. A first piston is positioned in the housing and has a third position wherein the piston engages and prevents the fingers from bending from the first position, and a fourth position wherein the piston does not engage and prevent the fingers from bending from the first position. The disconnect tool includes means for selectively retaining the first piston in the third position and means for moving the first piston from the third position to the fourth position. On-board and surface control systems may be incorporated to permit selective active of the disconnect mechanism. In addition, couplings and connector employing shape-memory materials may be included to secure the tool to coiled tubing, and a wireline.

15 Claims, 13 Drawing Sheets

U.S. PATENT DOCUMENTS

| | | | |
|---|---|---|---|
| 4,367,797 A | 1/1983 | Brown | 166/380 |
| 4,379,575 A | 4/1983 | Martin | 285/369 |
| 4,399,873 A | 8/1983 | Lindsey, Jr. | 166/380 |
| 4,455,041 A | 6/1984 | Martin | 285/369 |
| 4,501,058 A | 2/1985 | Schutzler | 29/446 |
| 4,650,228 A | 3/1987 | McMills et al. | |
| 4,694,878 A | 9/1987 | Gambertoglio | 166/377 |
| 4,776,393 A | 10/1988 | Forehand et al. | 166/55.1 |
| 4,832,382 A | 5/1989 | Kapgan | 285/369 |
| 4,877,089 A | 10/1989 | Burns | 166/377 |
| 4,902,045 A | 2/1990 | McGugan et al. | 285/24 |
| 4,984,632 A | 1/1991 | Sampa et al. | 166/237 |
| 4,997,041 A | 3/1991 | Petree | 166/377 |
| 5,086,843 A | 2/1992 | Mims et al. | 166/380 |
| 5,158,142 A | 10/1992 | Miszewski et al. | 166/377 |
| 5,201,814 A | 4/1993 | Kitchell et al. | 166/65.1 |
| 5,257,663 A | 11/1993 | Pringle et al. | 166/66.4 |
| 5,277,225 A | 1/1994 | Smith | 137/614.04 |
| 5,366,254 A | 11/1994 | Tucchio et al. | 285/23 |
| 5,526,888 A | 6/1996 | Gazewood | 175/320 |
| 5,607,250 A | 3/1997 | Tatterson et al. | 403/325 |
| 5,636,689 A * | 6/1997 | Rubbo et al. | 166/123 |
| 5,988,702 A | 11/1999 | Sas-Jaworsky | |

OTHER PUBLICATIONS

Genesys Downhole, Inc.; "*Genesys Hydraulic Release*" Sales Brochure; p. 1; Unknown .

Genesys Downhole, Inc.; "*Genesys Dual Flapper Check Valves*" Sales Brochure; p. 1; Unknown.

Halliburton Energy Services, Inc.; "*Releaseable Wireline Cable Head*" Sales Flyer; p. 1; 1998.

Drilex Services; "*Coiled Tubing Electrical Disconnect*" Sales Brochure; pp. 1–2; Unknown.

Sheila Popov; "Electric Release Improves Coiled Tubing Operations", Hart's Petroleum Engineer Int'l; p. 17; Unknown.

Antech, Ltd.; "*Memory Press/Temp Sub*" Sales Brochure; p. 1; Mar. 1994.

Antech, Ltd.; "*Coiled Tubing Tools*" Sales Brochure; p. 1; May 1994.

\* cited by examiner

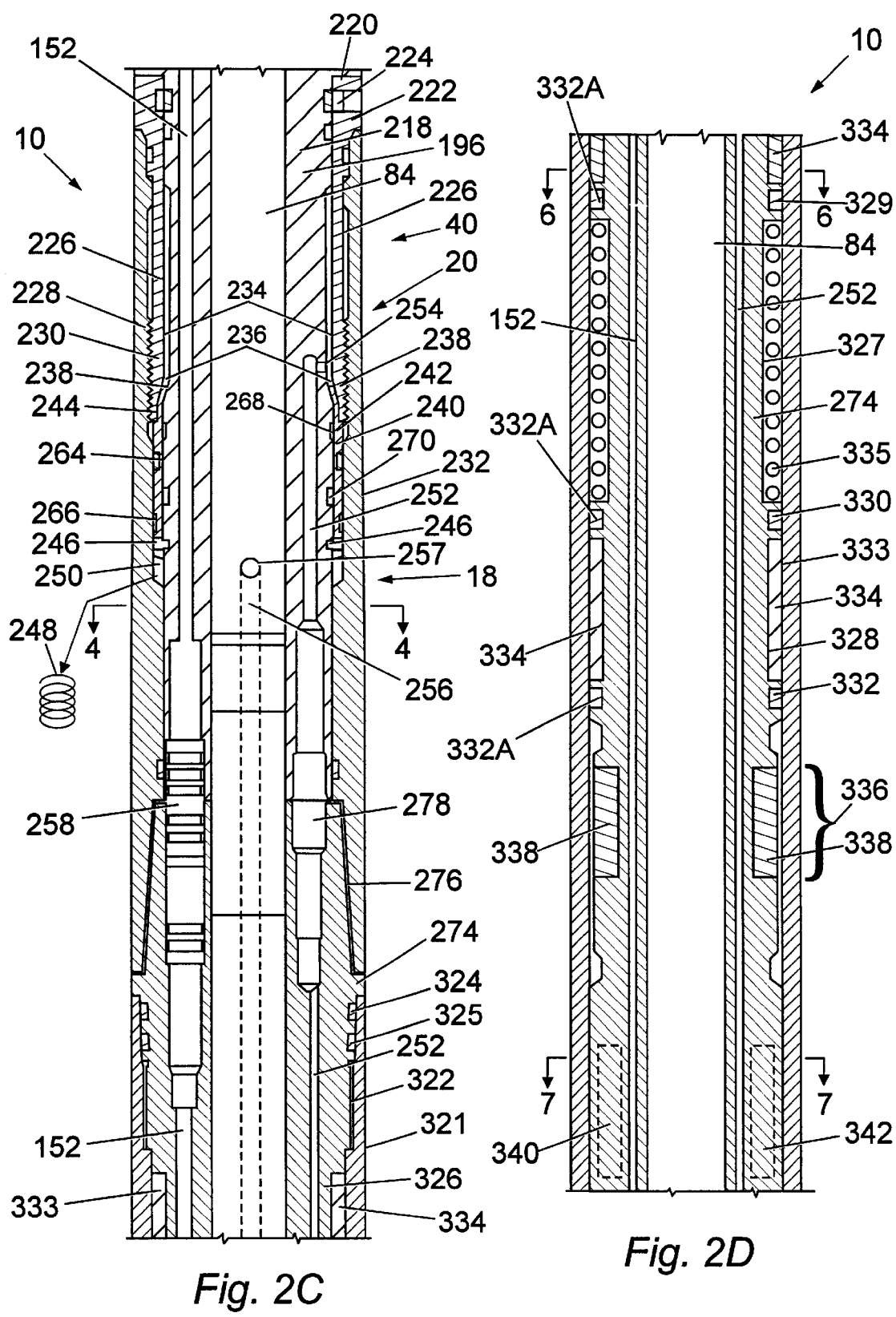

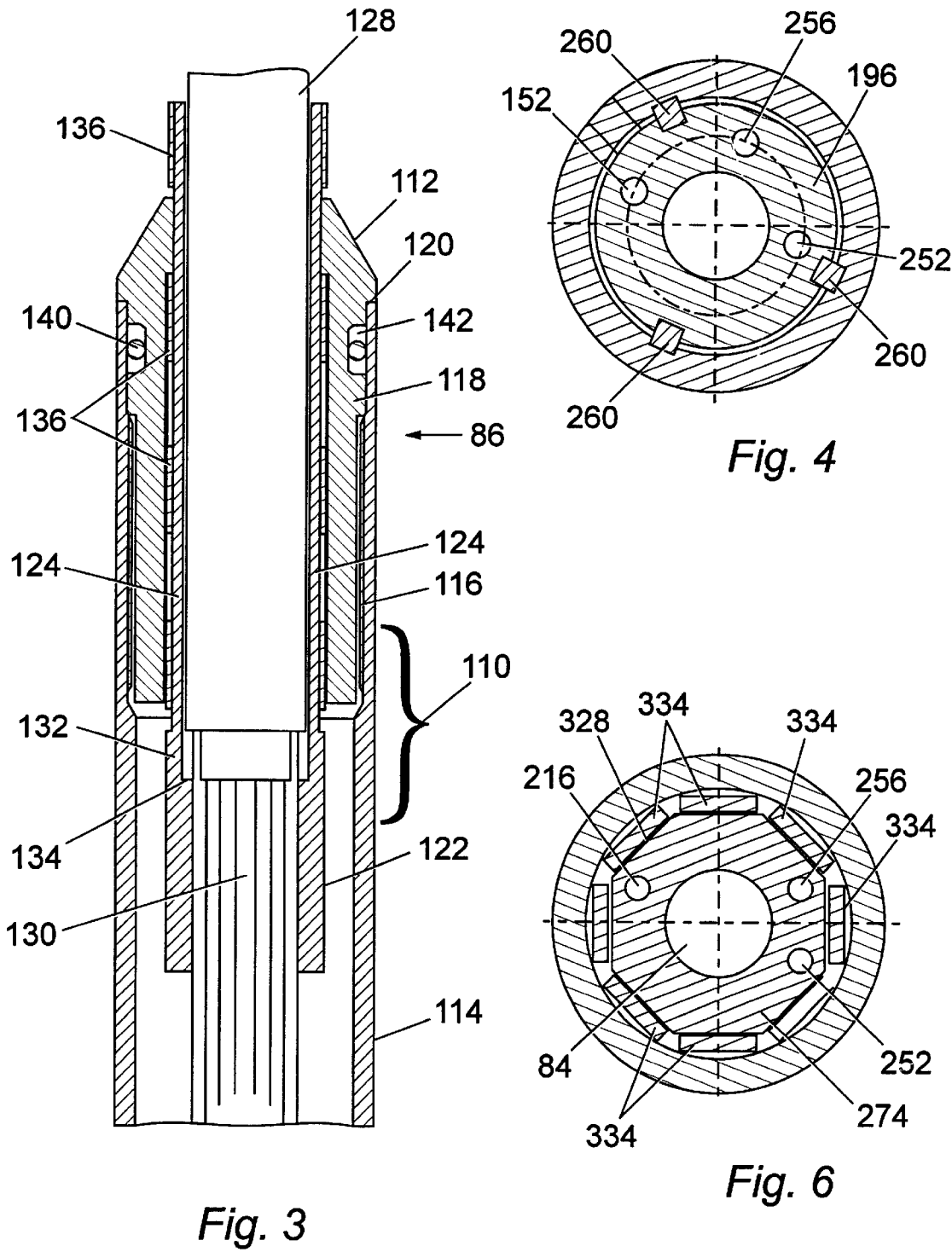

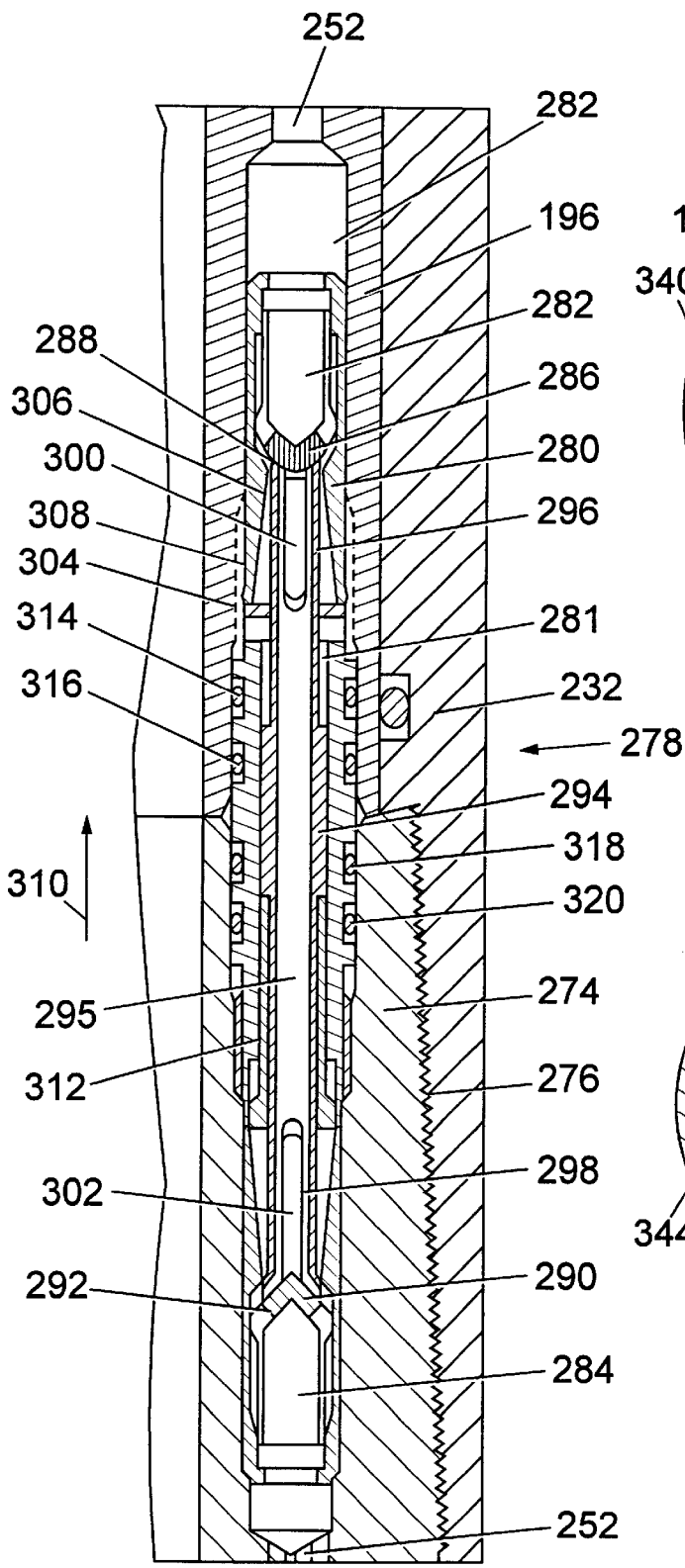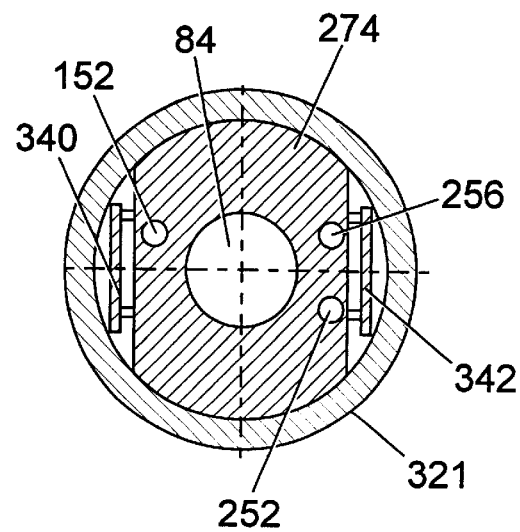
Fig. 7
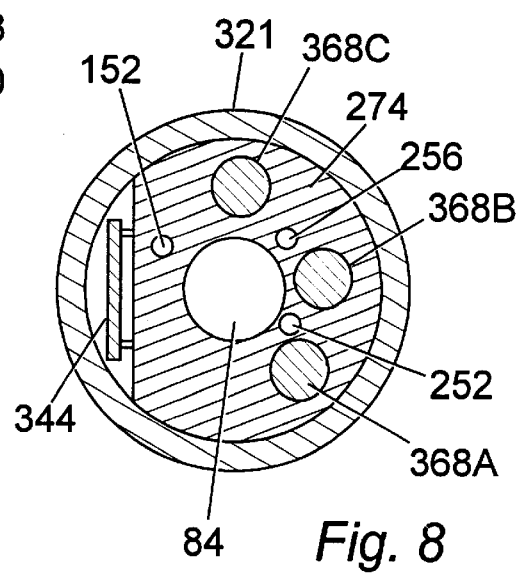
Fig. 8
Fig. 5

DISCONNECT TOOL

BACKGROUND OF THE INVENTION

1. Field of the Invention

This invention relates generally to disconnect tools, and more particularly to a disconnect tool incorporating a coupling for connecting to tool, tubing, or pipe, and a disconnect mechanism.

2. Description of the Related Art

Disconnect tools have long been known in the field of well drilling and servicing equipment. A disconnect tool is employed in a working string or bottom hole assembly ("BHA") to provide the capability of disconnecting the coiled tubing or drill pipe upstream from the working string or BHA. The disconnect tool is activated in situations where the working string has become stuck to such a degree that it cannot be readily dislodged from the wellbore either through upward thrust on the drill pipe or coiled tubing or via jarring forces imparted by a drilling jar, alone, or in combination with an accelerator incorporated into the working string. After the disconnect tool has been actuated and the removeable portion of the tool and upstream portion of the drill pipe or coiled tubing have been withdrawn from the wellbore, a fishing tool is normally inserted in the wellbore to engage and dislodge the stuck working string. Although the problem of stuck tools is present in both coiled tubing and conventional drill pipe operations, the requirement for a reliable disconnect capability is often more important in coiled tubing operations, since coiled tubing has a limited capacity to apply upward thrust on a stuck tool.

Most conventional disconnect tools consist of a tubular housing subdivided into two sections joined together at a joint that may be selectively decoupled to enable the two sections to be separated so that the length of tubing or string above one of the sections may be removed from the wellbore along with one of the sections. The upstream section of the housing ordinarily includes some type of coupling for connecting the disconnect tool to the drill pipe, coiled tubing, or wireline, as the case may be. The lower section of the housing also includes a coupling of one sort or another for connecting the disconnect tool to other components in the string, such as additional drill pipe or other tools. In the case of drill pipe, this lower connection is commonly a pin or box connection.

The tool-to-coiled tubing coupling mechanism in many conventional disconnect tools consists of a hydraulically actuated mandrel which is movable longitudinally to set or wedge sets of cooperating teeth together to engage the exterior of the end of a piece of coiled tubing. These types of mechanisms may loosen over time as a result of cyclic stresses that are commonly applied to a working string in the downhole environment. As the coupling loosens, there is the potential for the coiled tubing to disconnect from the disconnect tool. The result is an unanticipated and potentially costly fishing operation. In addition, hydraulically actuated coupling mechanisms tend to be quite lengthy. The length of a particular disconnect tool is ordinarily not a significant issue in drilling operations where regular threaded drill pipe is utilized. However, in coiled tubing applications it is desirable that the length of all the tools in a particular drill string be no longer than the length of the lubricator of the particular coiled tubing injector. Thus, it is desirable that the disconnect tool be economical in length to enable the operator to place as many different types of tools in the working string as possible while still keeping the overall length of the working string less than the length of the lubricator.

Another type of conventional coupling mechanism commonly employed in disconnect tools incorporates a sliding collar or a set of grub screws. Like the aforementioned hydraulically actuated mandrel mechanism, both the sliding collar and grub screw based mechanisms are subject to inadvertent disconnection, due to unavoidable play in the engagement between cooperating members or to the mechanism employed to prevent relative axial movement of the members. Undesirable length is also a drawback.

The disconnect mechanisms in most conventional disconnect tools may be loosely grouped into three basic categories: pull or thrust actuated; pressure actuated; and electrically actuated. Thrust actuated systems contain some type of mechanism which retards the axial movement of a mandrel or sleeve that is concentrically disposed in the housing. In most conventional thrust activated systems, the mechanism for resisting relative axial movement consists of sets of shear pins or a collet that are designed to fracture or collapse when a preselected axial thrust is applied to the working string from the surface. In another type of system used primarily on coiled tubing, the lower end of the coiled tubing is fluted against an inwardly chamfered surface on the housing. When the axial upward thrust applied to the working string exceeds a preselected limit, the fluted portion of the coiled tubing yields and releases from the disconnect tool.

Thrust activated disconnect tools present several disadvantages. In systems where the entire weight of the working string disposed below the disconnect tool is supported by the shear pins or collet, the axial jarring loads that are commonly imparted on the working string during operations may weaken the shear pins or collet so that the required upward axial thrust required to fail the shear pins or collapse the collet, as the case may be, is reduced below the anticipated level. As a consequence, the disconnect tool may be inadvertently triggered by applying an upward thrust on the working string for operational reasons other than tripping the disconnect tool. In addition, a given upward axial thrust load may not be fully transmitted to the disconnect tool. This circumstance may arise in wellbores with mechanical or formation-based obstructions that engage portions of the working string upstream from the disconnect tool. The problem may be compounded in highly deviated wells where the coiled tubing typically bottoms out against the sidewalls of the wellbore in the vicinity, and downstream of the bend in the wellbore. As a consequence, a greater than anticipated upward axial thrust must be applied to the working string from the surface in order to trigger the disconnect mechanism. This may be problematic in circumstances where the amount of upward axial thrust required to overcome the obstructions in the wellbore and provide a sufficient triggering load on the disconnect mechanism exceeds the yield or fracture strength of the tubing or any other components upstream from the disconnect tool.

In contrast to thrust activated disconnect mechanisms, pressure activated disconnect mechanisms operate in response to an increase in the pressure of the working fluid inside the working string. These types of disconnect mechanisms commonly incorporate a moving piston which moves axially in response to an increase in pressure above a preselected level to release or otherwise trigger a mechanical mechanism, such as a collet, or one or more radially movable dogs. In some conventional pressure actuated disconnect mechanisms, the requisite increase in working fluid pressure must be supplied from the surface. Robust and costly high pressure pumping equipment must normally accompany the use of such disconnect mechanisms. In other types of pressure activated disconnect mechanisms, the requisite build-up of working fluid pressure inside of the disconnect tool is accomplished by introducing an obstruction to the flow of working fluid through the disconnect tool downstream from the tripping mechanism. This is typically accomplished by dropping a scaling ball into the drill pipe or coiled tubing from the surface. The ball travels down through the tubing and seats on a shoulder in the disconnect tool downstream from the tripping mechanism, thereby closing off the flow path and enabling the pressure of the working fluid to build to the requisite level. Proper operation of pressure activated disconnect mechanisms places heavy demands upon the seals within such tools. If one or more of the seals in a given pressure activated disconnect tool fails, the pressurized working fluid inside the disconnect tool may vent into the well annulus without tripping the mechanism.

In addition, pressure activated disconnect mechanisms are subject to inadvertent actuation as a result of unanticipated pressure increases inside the disconnect tool caused by obstructions in the flow path of the working fluid downstream from the disconnect tool. As an example, an obstruction in the disconnect tool itself may cause the same effect as a scaling ball. The unanticipated increase in working fluid pressure may not be sensed at the surface in time to bleed pressure from the surface and avoid an inadvertent disconnection. Finally, in pressure activated disconnect systems employing a scaling ball, obstructions in the drill pipe, coiled tubing, or other components may prevent the scaling ball from actually reaching the proper position in the disconnect tool.

Electrically actuated disconnect mechanisms normally employ an electric motor to release a collet or set of dogs. The difficulty associated with such systems is that jarring forces and manufacturing irregularities may produce misalignment of the moving parts. As a result, the moving components may not readily move when the motor is actuated, leading to a potential locked rotor current condition that may quickly fail the motor. In addition, power loss from the surface may cripple this type of tool.

A disadvantage common to most conventional disconnect tools is the inability to reconnect following a deliberate or inadvertent disconnect.

The present invention is directed to overcoming or reducing the effects of one or more of the foregoing disadvantages.

SUMMARY OF THE INVENTION

In accordance with one aspect of the present invention, a coupling for connecting to an end of a tubular member is provided. The coupling includes a housing that has a longitudinal bore for receiving the end of the tubular member. A collet is coupled to the housing and is disposed in the bore. The collet has a plurality of bendable fingers each of which has a projecting tooth to engage the end of the tubular member. An annular member is positioned around the plurality of fingers and is composed of a shape-memory material. The annular member is deformable in situ from a temporary shape to a permanent shape in which the annular member squeezes the plurality of fingers into engagement with the end of the tubular member.

In accordance with another aspect of the present invention, a coupling for connecting first and second ends of first and second tubular members is provided. The coupling includes a housing that has a longitudinal bore for receiving the first and second end of the first tubular member. A first collet is coupled to the housing and disposed in the bore. The first collet has a first plurality of bendable fingers, each of which has a first projecting tooth to engage the first end of the first tubular member. A first annular member is positioned around the first plurality of fingers. A second collet is coupled to the housing and disposed in the bore. The second collet has a second plurality of bendable fingers each of which has a second projecting tooth to engage the second end of the second tubular member. A second annular member is positioned around the second plurality of fingers. The first and second annular members are composed of a shape-memory material and are deformable in situ from a temporary shape to a permanent shape in which the first and second annular members respectively squeeze the first and second plurality of fingers into respective engagement with the first and second ends of first and second tubular members.

In accordance with another aspect of the present invention, a connector for coupling to an end of a downhole conductor cable is provided. The connector includes a housing that has a longitudinal bore for receiving the end of the downhole conductor cable. A collet is coupled to the housing and disposed in the bore. The collet has a plurality of bendable fingers to engage the exterior of the end of the downhole conductor cable. An annular member is positioned around the plurality of fingers and is composed of a shape-memory material. The annular member is deformable in situ from a temporary shape to a permanent shape in which the annular member squeezes the plurality of fingers into engagement with the end of the downhole conductor cable.

In accordance with another aspect of the present invention, a disconnect tool is provided. The disconnect tool includes a housing that has a first segment and a second segment. A first collet is coupled to the first segment and has a first plurality of fingers each of which is bendable between a first position in which the fingers engage the first segment and prevent relative sliding movement between the first and second segments, and a second position in which the fingers do not engage the first segment and do not prevent relative sliding movement between the first and second segments. A first piston is positioned in the housing and has a third position wherein the piston engages and prevents the fingers from bending from the first position, and a fourth position wherein the piston does not engage and prevent the fingers from bending from the first position. The disconnect tool includes means for selectively retaining the first piston in the third position and means for moving the first piston from the third position to the fourth position.

In accordance with another aspect of the present invention, a disconnect tool is provided. The disconnect tool includes a housing that has a first segment, a second segment and a fluid chamber. A first collet is coupled to the first segment and has a first plurality of fingers each of which is bendable between a first position in which the fingers engage the first segment and prevent relative sliding movement between the first and second segments, and a second position in which the fingers do not engage the first segment and do not prevent relative sliding movement between the first and second segments. A first piston is positioned in the housing and is in fluid communication with the fluid chamber. The first piston has a third position wherein the first piston engages and prevents the fingers from bending from the first position, and a fourth position wherein the piston does not engage and prevent the fingers from bending from the first position. A member is coupled to the first piston and the housing and selectively retains the first piston in the third position. A second piston is positioned in the housing and has a first side in fluid communication with the fluid chamber and a second side, whereby movement of the second piston increases the pressure in the fluid chamber and urges the first piston to move to the fourth position.

In accordance with another aspect of the present invention, a disconnect tool for use with a tubular member and a wireline conductor is provided. The disconnect tool includes a housing that has a first segment, a second segment and a fluid chamber. A first collet is coupled to the first segment and has a first plurality of fingers each of which is bendable between a first position in which the fingers engage the first segment and prevent relative sliding movement between the first and second segments, and a second position in which the fingers do not engage the first segment and do not prevent relative sliding movement between the first and second segments. A first piston is positioned in the housing and is in fluid communication with the fluid chamber. The first piston has a third position wherein the first piston engages and prevents the first plurality of fingers from bending from the first position, and a fourth position wherein the first piston does not engage and prevent the first plurality of fingers from bending from the first position. A member is coupled to the first piston and the housing and selectively retains the first piston in the third position. A second piston is positioned in the housing and has a first side in fluid communication with the fluid chamber and a second side, whereby movement of the second piston increases the pressure in the fluid chamber and urges the first piston to move to the fourth position. A coupling for coupling the housing to the tubular member is provided as is a connector for connecting the wireline conductor to the housing.

In accordance with another aspect of the present invention, a hydraulic coupling for connecting a first hydraulic conduit having a first valve with a first poppet to a second hydraulic conduit having a second valve with a second poppet is provided. The hydraulic coupling includes a housing having a first longitudinal bore and a mandrel slidably positioned in the first longitudinal bore. The mandrel has a first tip and a second tip and a second longitudinal bore extending from the first tip to the second tip to enable fluid to pass from the first valve therethrough to the second valve. The mandrel has an outwardly projecting annular member positioned a first distance from the first tip. The first distance is selected so that the annular member shoulders against the first valve while enabling the first tip and the portion of the mandrel distal to the annular member to project into the first valve and unseat the first poppet when the housing is coupled to the first conduit, and so that the second tip projects into the second valve and unseats the second poppet when the housing is coupled to the second conduit. A biasing member is positioned in the housing for biasing the mandrel toward the first valve to keep the first and second poppets unseated when the housing is coupled to the first and second conduits.

BRIEF DESCRIPTION OF THE DRAWINGS

The foregoing and other advantages of the invention will become apparent upon reading the following detailed description and upon reference to the drawings in which:

FIGS. 2A–2F are sectional views of the disconnect tool in accordance with the present invention;

FIG. 3 is a detailed sectional view of an exemplary embodiment of a wireline connector shown in FIG. 2A in accordance with the present invention;

FIG. 4 is a sectional of FIG. 2C taken at section 4—4;

FIG. 5 is a detailed sectional view of an exemplary embodiment of a hydraulic coupling shown in FIG. 2C in accordance with the present invention;

FIG. 6 is a sectional view of FIG. 2D taken at section 6—6;

FIG. 7 is a sectional view of FIG. 2D taken at section 7—7;

FIG. 8 is a sectional view of FIG. 2F taken at section 8—8;

DETAILED DESCRIPTION OF SPECIFIC EMBODIMENTS

Figure 1:
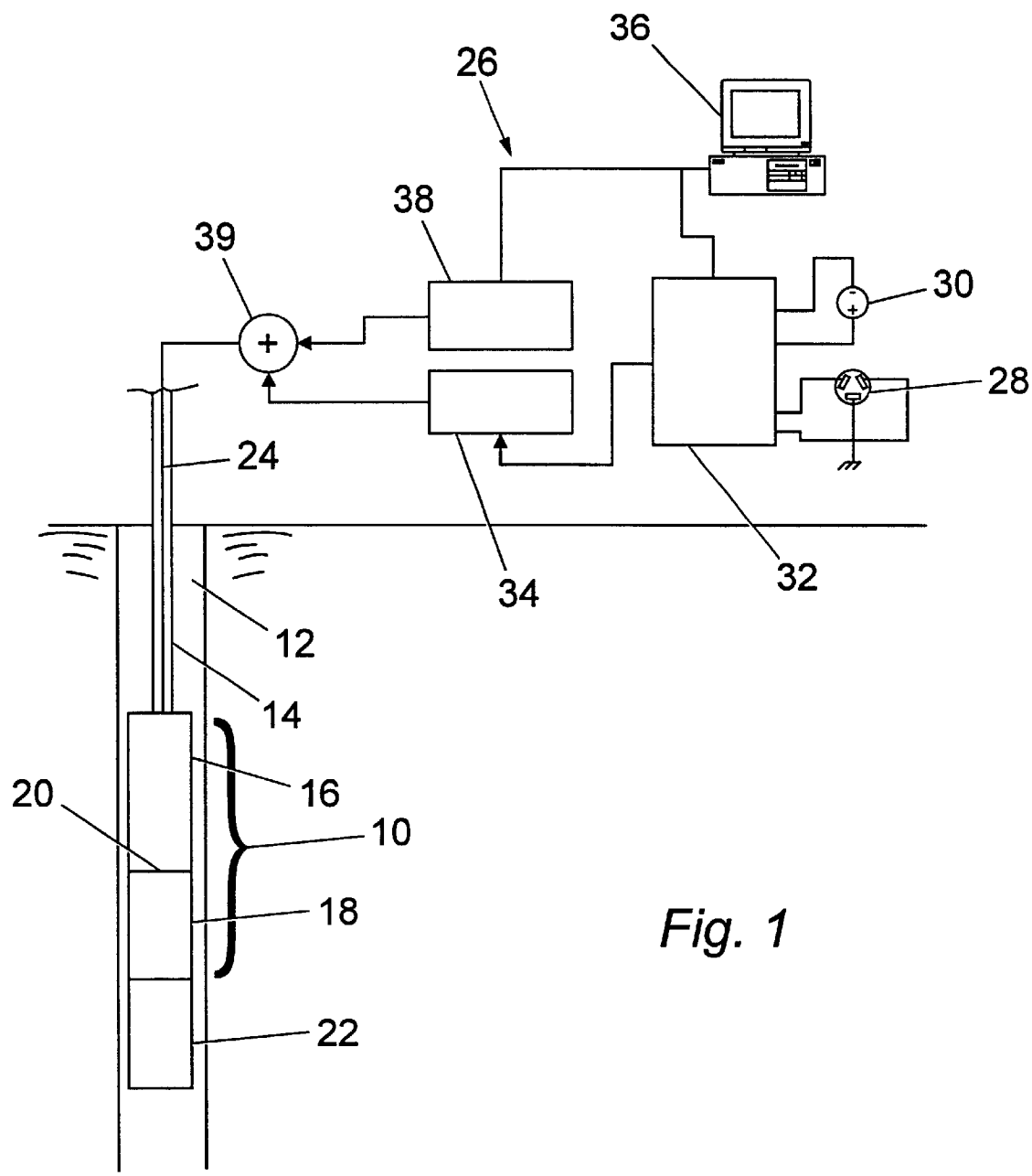
FIG. 1 is a schematic view of an exemplary embodiment of a disconnect tool in accordance with the present invention.

Turning now to the drawings, and in particular to FIG. 1, there is shown an exemplary embodiment of a disconnect tool 10 suspended in a wellbore 12 by a length of coiled tubing 14. The disconnect tool 10 is divided into two segments 16 and 18 that are selectively separable at the joint 20. The lower segment 18 of the disconnect tool 20 is coupled to another member 22, which may be another downhole tool, such as a shifting tool, a logging tool, a packer, or other type of downhole tool, or another segment of drill pipe. As discussed in detail below the segments 16 and 18 of the disconnect tool 20 are selectively separable at the joint 20 to enable the segment 16 and the coiled tubing 14 to be withdrawn from the wellbore 12 in the event the member 22 and/or the segment 18 becomes irretrievably lodged in the wellbore 12.

Electrical power and control signals to and from the disconnect tool 10 are transmitted via a downhole conductor or wireline 24 that is run through the coiled tubing 14 downhole to the disconnect tool 10. The wireline 24 is connected to a surface/control system 26 that includes an AC power supply 28 and a backup battery supply 30 connected to an uninterruptable power supply 32. The output of the uninterruptable power supply 32 is connected to a DC power supply 34 which converts the AC current to DC. A controller 36 is provided to perform a variety of control and data acquisition functions, such as controlling the power supply to the disconnect tool 10, arming and disarming the disconnect tool 10, and retrieving and displaying data obtained by various sensors in the disconnect tool 10. The controller 36 is connected to the uninterruptable power supply and a transceiver 38. Note that the outputs of both the transceiver 38 and the DC power supply 34 are connected to the wireline 24 via a summing node 39. Accordingly, the transceiver 38 is designed to feed signals from the controller 36 into the wireline 24 and vice versa, that is, receive signals transmitted from the disconnect tool 10. The simultaneous transmission of DC power and electronic control signals between the controller 36 and the disconnect tool 10 is possible through use of an appropriate data/power transmission protocol providing for simultaneous transmission of power and data through a single conductor. An example of a suitable protocol is the segnetted network architecture ("SEGNET") supplied by PES. Inc. of The Woodlands, Tex.

The detailed structure of the disconnect tool 10 may be understood by referring now to FIGS. 2A–2F, inclusive. The disconnect tool 10 is of substantial length necessitating that it be shown in six longitudinally broken sectional views, vis-a-vis FIGS. 2A, 2B, 2C, 2D 2E and 2F. The disconnect tool 10 generally consists of a tubular housing 40 subdivided into two tubular segments 16 and 18 selectively separable at the joint 20 shown in FIG. 2C. Each of the segments 16 and 18 consists of a plurality of tubular segments joined together, preferably by threaded interconnections. The upper section of the segment 16 has an upper tubular portion 42 threadedly attached to an intermediate tubular portion 44 at 46 to provide a housing for a coiled tubing coupling 48 that connects the disconnect tool 10 to the coiled tubing 14. The upper tubular portion 42 includes an internal bore 50 that is dimensioned to receive the end of the coiled tubing 14.

The intermediate section 44 includes a collet 52 that has a plurality of longitudinally projecting fingers 54 that bear against the exterior of the coiled tubing 14. The fingers 56 are advantageously composed of a material with sufficient strength and flexure to enable the fingers to be moveable when squeezed against the exterior of the coiled tubing 14, and to withstand the anticipated loads. Exemplary materials include 4140 alloy steel, inconel, and like materials. To enhance the physical engagement between the fingers 54 and the tubing 14, the mating surfaces of the fingers 54 and the tubing 14 may be provided with structures that engage and resist axial movement. For example, some of all of the fingers 54 may be provided with at least one, and advantageously, a plurality of radially inwardly projecting members or teeth 56 that are designed to securely engage the exterior of the coiled tubing 14 when the fingers 54 are brought into tight physical engagement with the coiled tubing 14.

The skilled artisan will appreciate that coiled tubing often presents a less than perfectly circular cross-section. The fingers 54 will conform to a certain extent to noncircular cross-sections. To facilitate engagement between the fingers 54 and more highly deviated cross-sections of coiled tubing, each finger 54 may be pivotally coupled to a bracket 58 by pins 60. Each bracket 58, is, in turn, coupled to the intermediate section 44 by pins 62. Each two adjacent fingers 54 are peripherally spaced apart and separated by a longitudinally projecting finger 64 which is integral with the intermediate section 44. The fingers 64 terminate short of the toothed portions of the fingers 54 and define an upwardly facing annular surface 66 against which the end 68 of the coiled tubing 14 abuts. Alternatively, the fingers 54 may be joined to a common annular hub (not shown) that is secured to the intermediate section 44.

The fingers 64 are internally threaded at 70 and coupled to the lower end 72 of a tubular member 74. The lower end 72 of the tubular member 74 transitions to a reduced diameter portion 76, thereby defining an upwardly facing annular shoulder 78. The outer diameter of the intermediate portion 76 is dimensioned to be slidably received within the end 68 of the coiled tubing 14 so that the end of the coiled tubing 68 abuts not only the annular surfaces 66 on the upwardly projecting fingers 64, but also the upwardly facing annular surface 78. The tubular member 74 provides a relatively rigid cylindrical member which is designed to prevent the coiled tubing 14 from crimping or otherwise collapsing when the fingers 54 are engaged against the coiled tubing 14.

The collet fingers 54 are brought into secure physical engagement with the exterior of the coiled tubing 14 by one or more longitudinally spaced annular members 80. The annular members 80 are retained in longitudinally spaced-apart relation by a plurality of annular spacers 82. The annular members 80 are advantageously composed of a shape-memory material that deforms in response to a particular stimulus, such as temperature change or exposure to water, for example. A thermally sensitive shape-memory material undergoes dimensional changes when heated above the phase transition temperature for that particular material. When the material has changed dimensions, the deformation is fixed and the shape remains stable.

During fabrication, the annular members 80 are initially fabricated with a permanent shape corresponding to an inner diameter that is smaller than the outer diameter of the collet fingers 54 when the collet fingers 54 are in secure physical engagement with the coiled tubing 14. The fabrication process allows the shape-memory material to be advantageously deformed into a temporary shape with an inner diameter that is greater than the outer diameter of the collet fingers 54 so that the coiled tubing 14 may be readily slipped into position between the tubular member 74 and the fingers 54.

The annular members 80 may then be heated in situ, that is, after they have been installed over the fingers 54 and after the coiled tubing 14 has been inserted in position. The in situ heating may be performed by a resistance heater, a hot air gun, heated blocks, by introducing a hot fluid into the coupling 48 or like methods. Upon heating the annular members 80 above the phase transition temperature, the annular members 80 automatically deform back into their permanent shapes, thereby tightly squeezing the fingers 54 into secure physical engagement with the exterior of the coiled tubing 14. In this way, the coiled tubing 14 is secured to the intermediate section 44 by structural components that, unlike conventional methods such as threaded members and/or axially moving wedges, are not subject to loosening over time as a result of repeated jarring and torsional motions associated with the downhole environment.

The number, size, and spacing, of the annular members 80 is largely a matter of design discretion. Indeed, the plurality of annular members 80 depicted in FIG. 2A may be replaced with a single annular member that shrouds the entirety of, or some lesser portion of the toothed portions of the fingers 54. Exemplary materials for the annular members 80 include a nickel titanium alloy manufactured under the trade names nitinol, tinel, or like materials.

The aforementioned coupling 48 has been described in the context of engagement with coiled tubing. However, the skilled artisan will appreciate that the coupling may be secured to a wide variety of member, such as, for example, a downhole tool, oilfield pipe or like members.

The segment 16 includes a longitudinal bore 84 to permit a working fluid transmitted through the coiled tubing 14 to be passed through the disconnect tool 10 and to permit insertion of the wireline 24 into a connector 86. It is desirable to prevent working fluid pumped through the coiled tubing 14 to escape the housing 42, and similarly desirable to prevent the influx of fluid from the wellbore 12 into the disconnect tool 10. Accordingly, the joint between the intermediate section 44 and the housing 42 is provided with a pair of longitudinally spaced O-rings 88 and 90. Similarly, longitudinally spaced O-rings 92 and 94 are positioned between the exterior of the coiled tubing 14 and the inner diameter of the housing 42. An annular member or spacer 96 is positioned between the O-rings 92 and 94 and another annular member 98 is positioned between the O-ring 94 and abuts the upper ends 100 of the fingers 54.

The wireline connector 86 is coupled at its lower end 102 to an intermediate section 104 of the overall tool housing 40. The connector 86 is secured to the intermediate section 104 by a pair of opposed set screws 106 and 108. The detailed structure of the wireline connector 86 may be understood by referring now also to FIG. 3, which is a highly magnified sectional view of the connector 86. The connector 86 consists of a tubular housing 110 that has an upper tubular portion 112 threadedly coupled to a lower tubular portion 114 at 116. The upper tubular portion 112 includes a reduced diameter portion 118 that defines a downwardly facing annular shoulder 120 against which the upper end of the lower tubular portion 114 is abutted. A collet 122 is positioned inside the housing 110 and has a plurality of longitudinally projecting and peripherally spaced, bendable fingers 124. The fingers 124 are designed to engage the exterior of the wireline 24. In the embodiment depicted in FIGS. 2A and 3, the outermost or thickest insulating sheath 126 and the outer reinforcing wire sleeve (not shown) of the wireline 24 is stripped uphole from the connector 86 so that the fingers 124 physically engage the exterior of the inner reinforcing wire sleeve 128 of the wireline 24. The lowermost end of the wireline 24 is stripped of the reinforcing wire sleeve 128 and the innermost insulating sheath (not shown) near the lower ends of the fingers 124, to expose the individual conductor wires 130 of the wireline 24. The number of individual conductors 130 of the wireline 24 will depend upon the type of wireline involved. In the illustrated embodiment, the wireline 24 contains seven individual conductors 130. The internal diameter of the collet 122 expands slightly at the roots 132 of the fingers 124 to define and upwardly facing annular shoulder 134 against which the reinforcing wire sleeve 128 of the wireline 24 may abut to prevent the wireline 24 from projecting into the connector 86 farther than desired.

Figures 2A, 2B:
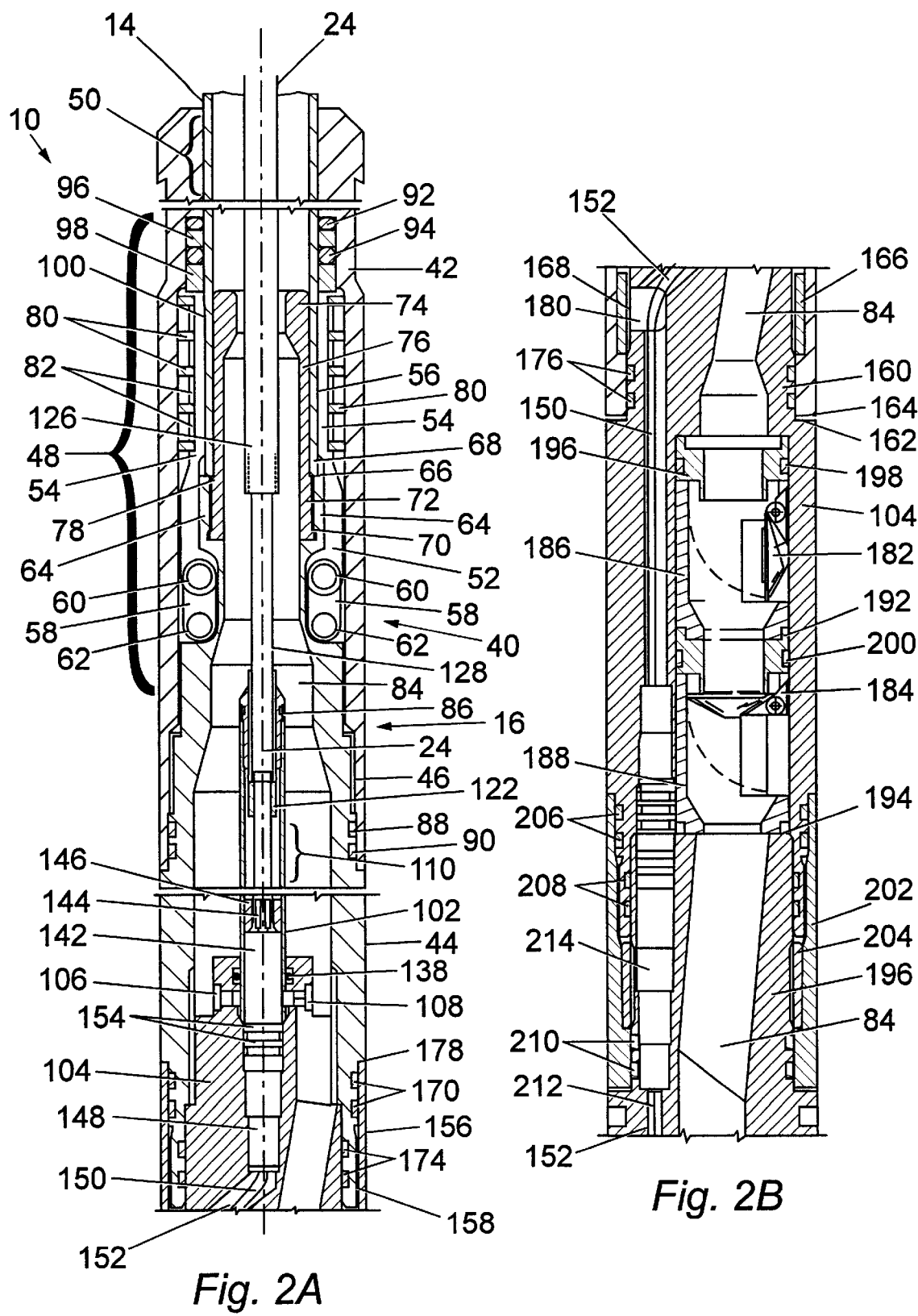

The fingers 124 are held in secure physical engagement with the exterior of the inner sleeve 128 by a plurality of longitudinally spaced annular members 136 that, like the aforementioned annular members 80 depicted in FIG. 2A, are advantageously composed of a heat-sensitive shape-memory material that is deformable in situ from a temporary shape with an inner diameter larger than the outer diameter of the sleeve 128 and the collet fingers 124 to a permanent shape that has an inner diameter smaller than the outer diameter of the fingers 124. As with the aforementioned coiled tubing coupling 48 shown in FIG. 2A, the connector 86 maintains a snug reliable physical engagement with the wireline 24 that is not prone to loosening as a result of downhole forces. In addition, the requirement to separate and bend the individual reinforcing wires of the wireline 24 outward and/or backward to facilitate a conventional wireline coupling mechanism is eliminated. As a result, the potential for fracturing or significantly weakening the reinforcing wires is eliminated.

The exterior of the connector 86 is exposed to the working fluid. Accordingly, it is desirable to seal the interior of the connector 86 from the flow of working fluid. In this regard, O-ring seals 138 and 140 are respectively positioned in an annular groove 141 between the housing 110 and the section 104 and in an annular groove 142 between the exterior of the upper tubular portion 112 and the lower tubular portion 114.

A pin-socket type connector 142 is positioned inside the housing 110. The connector 142 includes a number of terminals 144 coupled to the ends of the individual conductors 130. The terminals 144 may be pin, socket, or another type of connection suitable for mating with the type of connector, e.g., pin or socket. A compliant boot 146 shrouds the terminals 144 and is advantageously composed of a compliant electrically insulating material, such as natural or nitrile rubbers or like materials. The number of terminals 144 will usually match the number of individual conductors 130 in the wireline 24, but need not depending upon the electrical requirements of the disconnect tool 10. Each terminal 144 is connected to an elongated conductor that spans the length of the connector 142 and is not visible.

An electrical pathway from the lower end 148 of the connector 142 may be established by separate conductors 150 positioned in a conduit 152 in the intermediate section 104. The conduit 152 is sealed against the intrusion of working fluid past the connector 142 by a plurality of O-rings 154 disposed around the connector 142. The conduit 152 extends to the bottom of the tool 10, spanning the various housing sections along the way. For simplicity of illustration a conductor is not always shown in the conduit. However, the skilled artisan will appreciate that there will typically be one or more conductors in the conduit 152.

The intermediate section 104 is joined to the intermediate section 44 by an intermediate section 156 that is threadedly attached to the intermediate section 44 at 158. The intermediate section 104 includes a reduced diameter portion 160 that defines an upwardly facing annular shoulder 162 against which the lower end 164 of the intermediate section 156 may abut. The intermediate section 104 is coupled to the intermediate section 156 by a spin collar 166 that engages a set of external threads 168 on the intermediate section 104. The spin collar 166 may be rotated to establish a fixed gap between the opposing annular shoulders 164 and 162. The overall joint between the intermediate section 156, the intermediate section 104, and the intermediate section 44 is sealed against fluid leakage by pairs of longitudinally spaced O-rings 170, 174, and 176. The joint has a self-sealing function. As a result of the differing cross-sectional areas of the annular shoulder 164 and the annular shoulder 178, the differential pressure acting on the intermediate section 156 will tend to urge the intermediate section 156 to remain in physical engagement with the intermediate section 44. Prior to installation of the spin collar 166 and connection between the sections 44, 156, and 104, access to the conductor wires 150 within the conduit 152 may be had through an access port 180.

Referring specifically to FIG. 2B, the intermediate section 104 includes a pair of longitudinally spaced check or flapper valves 182 and 184. The flapper valve 182 is shown fully open and the flapper valve 184 is shown fully closed. The flapper valve 182 includes an annular valve body 186 longitudinally spaced from an identical valve body 188 for the valve 184 by an annular spacer 190. A similar annular spacer 192 is positioned below the valve body 188 and abuts an upwardly facing annular shoulder 194 of an intermediate section 196. The check valves 182 and 184 are designed to prevent working fluid and debris from the wellbore from flowing back up through the disconnect tool 10. Working fluid and/or debris is prevented from bypassing the check valves 182 and 184 by O-rings 198 and 200 respectively disposed around the valve bodies 186 and 188.

The intermediate section 104 is secured to the intermediate section 196 by an intermediate section 202 and a spin collar 204 that are identical in structure and function to the intermediate section 156 and the spin collar 166 described above. Similarly, identical sets of O-rings 206, 208, and 210 are provided to seal the joint. To enable the set of conductors 150 to be quickly connected and/or disconnected from a complimentary set of conductors 212 in the portion of the conduit 152 in the intermediate section 196, a connector 214 like the connector 142 shown in FIG. 2A is positioned within the intermediate section 196.

Referring now to FIGS. 2B and 2C, the intermediate section 196 is provided with a reduced diameter portion 218 that defines a downwardly facing annular shoulder 220 and accommodates a tubular collet 222. The upper end of the collet 222 is abutted against the annular shoulder 220. An adjustable split ring 224 secures the collet 222 to the intermediate section 196. The collet 222 includes a plurality of longitudinally projecting and peripherally spaced, moveable fingers 226. Each of the fingers 226 has one or more outwardly projecting teeth 228 that engage a corresponding inwardly projecting tooth or set of teeth 230 formed on the interior of an intermediate section 232 of the segment 18. The lower ends 234 of the fingers 226 are provided with inner surfaces 236 that are configured to mate with outer surfaces 238 formed on the exterior of the intermediate section 196 proximate the surfaces 236. The fingers 226 are bendable from a first position shown in FIG. 2C to a second position wherein the fingers collapse inwardly until the surfaces 236 engage the surfaces 238 and the corresponding teeth 228 and 230 disengage.

The fingers 226 are selectively retained in the straight or uncollapsed position shown in FIG. 2C by a piston positioned in the housing 40 between the exterior of the intermediate section 196 and the interior of the intermediate section 232. The upper end 242 of the piston 240 includes a lip 244 that engages the surfaces 236 of the fingers 226 and prevents the fingers 226 from collapsing inward to the bent position. The piston 240 is a generally annular member that, as discussed more below, is selectively movable longitudinally from a first position shown in FIG. 2C downward to a second longitudinal position in which the lip 244 clears the fingers 226 and no longer prevents the fingers 226 from bending from the position shown in FIG. 2C to a position where the surfaces 236 engage the surfaces 238. The piston 240 is initially retained in the position shown in FIG. 2C by one or more members 246 which are coupled to the piston 240 and another structure within the housing 40, in this case the intermediate section 196. In the illustrated embodiment, the members 246 are shear pins composed of a suitable material and suitably sized to fail when a preselected axial force is imparted on the piston 240. Alternatively, as shown schematically in FIG. 2C a spring 248 may be inserted into the annular space 250 in lieu of or in addition to the members 246.

The piston 240 is movable downwardly by hydraulic fluid flowing through a chamber 252 that is vented to the topside of the piston 240 at 254 and extends longitudinally downward through the disconnect tool 10 as shown in FIGS. 2C, 2D, 2E, and 2F. As described more fully below, if it is desired to disconnect the segments 16 and 18 at the joint 20, the pressure of the fluid in the chamber 252 is increased until the downward force acting on the piston 240 overcomes the restraining force of the members 246 or the coiled spring 248, as the case may be, and urges the piston 240 to move longitudinally downward, clearing the fingers 226. The annular space 250 is also provided with a volume of hydraulic fluid and is vented to an elongated hydraulic chamber 256 shown in phantom in FIGS. 2C, 2D, 2E, and 2F, and visibly shown in FIG. 4, which is a cross-sectional view of FIG. 2C taken at section 4—4. FIG. 4 illustrates the hydraulic chambers 252 and 256, and the conduit 152, in which one or more electrical conductors are positioned and connected to an electrical connector 258 like the electrical connector 214 described above and shown in FIG. 2A. A port 259 shown in phantom in FIG. 2C, leads from the exterior of the intermediate section 196 to the chamber 256. The port 259 and the chamber 256 are designed to enable high pressure hydraulic fluid in the space 250 to be vented into the chamber 256 after the piston 240 has moved to the lower position. It is anticipated that the hydraulic pressure in the chamber 252 may be relatively high even after the piston 240 has triggered. It is accordingly desirable to vent that high pressure fluid if possible.

Several longitudinal keys 260 are positioned in between the exterior of the intermediate section 196 and the interior of the intermediate section 232, principally to establish a known rotational alignment of the section 196 and to prevent relative rotation between the section 196 and the section 232.

It is desirable to seal the piston 240 against the leakage of hydraulic fluid so that pressure against the piston 240 is maintained until the members 246 fail. In this regard, an O-ring seal 264 and a wear ring 266 are positioned between the exterior of the piston 240 and interior of the intermediate section 232. Similarly, an O-ring seal 268 and a wear ring 270 are positioned between the interior of the piston 240 and the exterior of the intermediate section 196.

The lower end of the intermediate section 232 is threadedly coupled to the upper end of an intermediate section 274 at 276. The threaded engagement at 276 may be a standard pin box threaded connection commonly used in oil tools, or a tapered threaded connection with metal-to metal seal as depicted in FIG. 2C. The tapered connection provides a more fluid leakage resistant engagement between two tubular members. The sections of the electrical conduit 152 on either side of the threaded joint 276 are connected by the aforementioned electrical connector 258. Similarly, the sections of the chamber 252 positioned above and below the joint 276 are connected by a tubular hydraulic coupling 278.

The detailed structure of the hydraulic coupling 278 may be understood by referring now to FIG. 5, which is a detailed cross-sectional view of the hydraulic coupling 278. The coupling 278 includes a tubular housing 280 that has a first longitudinal bore 281 extending therethrough and is dimensioned at its upper end and lower end to thread into place over respective check valves 282 and 284 positioned in the chamber 252. The first check valve 282 includes a longitudinally movable poppet 286 that is spring biased against an upwardly facing chamfered surface 288. In like fashion, the check valve 284 includes a poppet 290 that is spring biased toward a chamfered surface 292. The coupling 278 includes a mandrel 294 that is slidably positioned in the bore 281. The mandrel 294 includes a second longitudinal bore extending from a first tip 296 to a second tip 298 to convey fluid from the first check valve 282 to the second check valve 284. The first tip 296 includes one or more openings 300 and the tip 298 includes a corresponding opening or openings 302 to permit fluid to enter and exit the bore 295. The first tip 296 includes an outwardly projecting annular member 304 that is longitudinally spaced from the end 306 of the tip 296 so that when the annular member 304 shoulders against the body 308 of the check valve 282, as shown in FIG. 5, the portion of the mandrel 294 distal to the annular member 304 projects into the valve body 308 and unseats the poppet 286 as shown. The mandrel 294 is upwardly biased in the direction indicated by the arrow 310 by a biasing member 312 positioned inside the housing 280 to bias the mandrel 294 toward the check valve 282. The biasing, member 312 may be a coiled spring or other type of spring. First and second sets 314 and 316 and 318 and 320 of O-ring seals are provided between the exterior of the housing 280 and the mating interior surface of the intermediate section 196 and the mating interior surface of the intermediate section 274 to prevent hydraulic fluid from bypassing the bore 295 in the mandrel 294, and to prevent contamination of hydraulic fluid by working fluid.

In operation, the hydraulic coupling 278 is inserted into one or the other of the intermediate sections to be connected, i.e., the section 196 or the section 274, and the sections 196 and 274 are brought together by the cooperating threads at 228 and 230. For the purpose of this illustration, it is assumed that the hydraulic coupling 278 is first inserted into the intermediate section 274 above the check valve 284. When the coupling 278 is secured above the check valve 282, the tip 298 of the mandrel 294 projects into the check valve 282 but does not open the poppet 290. Next, the intermediate section 196 is slipped over the coupling 278 and the threaded connection at 228 and 230 is tightened to bring the sections 274 and 196 together. The collet 222 serves as a spin collar that brings the sections 274 and 196 together.

As the sections 196 and 274 are brought together, the annular member 304 shoulders against the valve body 308, the poppet 286 is unseated, opening the check valve 282, and the mandrel 294 is moved longitudinally downward as a result of the engagement between the annular member 304 and the valve body 308. The biasing member 312 maintains the tip 296 in contact with the poppet 286 to maintain the poppet 286 in an open position while the mandrel 294 is moved downward. At the same time, the tip 298 is engaging and unseating the poppet 290 in the check valve 284. When the threaded connection at 228 and 230 is fully tightened, the poppets 286 and 290 are held in open positions respectively by the tips 296 and 298 and retained in open positions by the dimensional difference between the mandrel length and the joint makeup distance between the poppets 286 and 290. The spring 312 ensures that the mandrel 294 moves and closes a given poppet when the joint at 20 is broken.

The hydraulic coupling 278 provides the advantageous capability of providing a structure for quickly connecting two ends of a hydraulic conduit, namely the chamber 252, and for maintaining the up and downstream check valves 282 in an open position during normal operations. The ability to maintain an open pathway for hydraulic fluid flow is desirable so that sudden closure of one or the other of the valves 282 or 284 as a result of an unanticipated pressure surge in the chamber 252 or shock loading is avoided. In this way, a potentially damaging water hammer situation is prevented which might otherwise damage various seals or other components in the tool.

Referring again to FIGS. 2D and 2F, an intermediate housing section 321 is threadedly engaged to the intermediate section 274 below the threaded joint 276 at 322. The joint is sealed against fluid passage by O-ring seals 324 and 325 that are positioned between the exterior of the intermediate section 274 and the interior of the upper end of the intermediate section 321. The intermediate section 274 includes three longitudinally spaced apart reduced diameter sections 326, 327, and 328 separated by sets of annular flanges 329, 330 and 332, each having a shock absorbing elastomeric ring 332A. As best seen in FIG. 6, which is a cross-sectional view of FIG. 2D taken at section 6—6, the reduced diameter sections 326, and 328 are provided with generally polygonal cross-sections to provide a series of elongated spaces 333 in which magnets 334 for casing collar location may be positioned. A casing collar locator coil assembly 335 is positioned around the section 327 and inductively coupled to the magnets 334.

Primary electrical power is supplied to the tool 10 via the wireline conductor 24 shown in FIG. 2A. This includes the electrical power necessary to trigger the disconnect feature and operate the instrumentation of the tool 10. It is desirable to incorporate a backup power supply so that, even if the primary power supply fails, the tool 10 may still trigger to disconnect downhole. In this regard, a power supply 336 in the form of a plurality of peripherally spaced capacitors 338 is positioned inside the tool 10. The capacitors 338 are connected to a conductor in the conduit 152 via a connection that is not visible in FIG. 2D. The more detailed connections of the capacitors 338 with other components in the tool 10 are described below. In addition to capacitors, thermal batteries may be used.

Figures 2E, 2F:
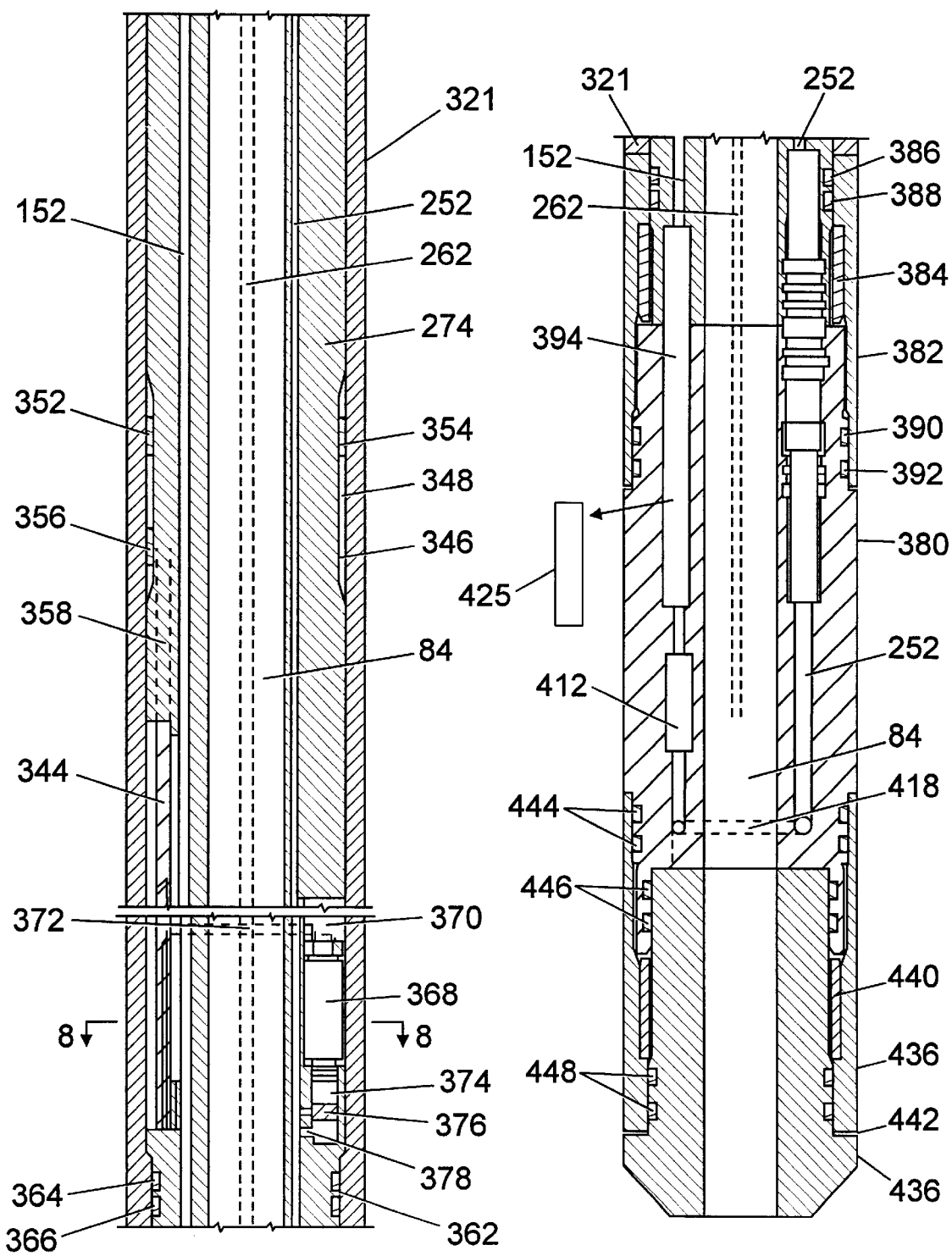

The intermediate section 274 includes printed circuit boards 340 and 342, shown in phantom in FIG. 2D and in section in FIG. 7, which is a sectional view of FIG. 2D taken at section 7—7, and an additional printed circuit board 344 shown in cross-section in FIG. 2E. The boards 340, 342, and 344 are positioned in spaces like the spaces 334 described above. The boards 340, 342, and 344 may be fabricated from polycarbonate plastic, ceramic materials, or other suitable types of substrate/circuit board materials. The components and interconnections of the boards 340, 342, and 344 will be described in more detail below.

As shown in FIG. 2E, the intermediate section 274 is provided with a reduced diameter portion 346 that provides an annular chamber 348 between the exterior of the intermediate section 274 and the interior of the intermediate section 321. The annular chamber 348 provides room to accommodate one or more strain gauges 352, 354, and 356 for measuring tensile, compressive, torsional, and bending strains on the intermediate section 274. The electrical outputs of the strain gauges 352, 354, and 356 are connected to the internal circuitry of the tool 10 via a longitudinal slot 358 in the section 274 shown in phantom leading to the circuit board 344. The gauges 352, 354, and 356 are mounted on the reduced diameter portion 346 and are not physically connected to the interior surface of the intermediate section 321. Furthermore, the gauges 352. 354, and 356 are additionally isolated from strains subjected to the intermediate section 321 that might otherwise contaminate the readings of the gauges 352, 354, and 356. This is accomplished by physically connecting the intermediate section 321 to the intermediate section 274 only at one end, namely at the threaded connection 322 shown in FIG. 2C. At the lower terminus of the intermediate section 321 shown in FIG. 2E and partially in FIG. 2F, the intermediate section 321 is not threadedly engaged with the intermediate section 274. Rather, a sliding joint at 362 is established and sealed against fluid intrusion by a pair of O-ring seals 364 and 366. Accordingly, axial and torsional loads are transmitted directly through the intermediate section 274 and loads applied to the intermediate section 321 by wellbore pressure or other causes are not transmitted directly to the strain gauges 252, 254, and 256 in the intermediate section 274. The working fluid pressure does act on the inner diameter of the section 274. It is therefore necessary to monitor the pressure in the bore 84 so that the pressure effects may be electronically subtracted out of the strain gauge signals.

It is desirable to be able to sense the temperature and pressure of the hydraulic fluid in the chamber 252. These parameters provide verification of the condition of the hydraulic fluid, as well as the proper function of the triggering mechanism and pressure relief devices incorporated into the tool 10 as described below, both before and after firing. Accordingly, a temperature/pressure sensor 368A is positioned in a chamber 370 defined by the intermediate section 274 and the intermediate section 321. One end of the temperature/pressure sensor 368A includes electrical outputs that are routed to the circuit board 344 via conductors 372 shown in phantom in FIG. 2E. The other end of the sensor 368A is coupled to a substantially sealed chamber 374. A compensating piston 376 is disposed in the chamber. The chamber 374 is in fluid communication with the chamber 252 via the port 378. The chamber 374 and the piston 376 are configured so that the pressure on either side of the piston 376 is essentially equal. Thus, the pressure of the fluid in the chamber 252 will be readily sensed by the sensor 368A.

The piston 376 serves primarily as a structure to prevent the influx of debris from the chamber 252 which might otherwise contaminate and damage the sensor 368A. It is anticipated that heat from the fluid in the chamber 252 will transfer to the fluid in the chamber 374 and thus to the temperature/pressure sensor 368A. There will be some time lag between a change in pressure and temperature in the fluid in the chamber 252 and the sensing of those changes by the sensor 368A. This time lag is due primarily to frictional forces resisting movement of the piston and to the time lag associated with the transfer of heat from the fluid in the chamber 252 to the fluid in the chamber 274. The types of sensors employed to sense temperature and pressure are largely a matter of design discretion. In an exemplary embodiment, the temperature/pressure sensor 368A incorporates a thermocouple-like element, such as an RTD, and a strain gauge transducer for sensing temperature and pressure. Referring now also to FIG. 8, which is a sectional view of FIG. 2E taken at section 8—8, temperature/pressure sensors 368B and 368C may be positioned in the tool 10 to sense the temperature and pressure of the working fluid in the bore 84 and the fluid in the wellbore (See FIG. 1). The sensors 368B and 368C may be substantially identical to the sensor 368A.

Referring now to FIG. 2F, the lower end of the intermediate section 274 is threadedly coupled to an intermediate section 380 via an intermediate section 382 and a spin collar 384 in an identical fashion to the joint incorporating the spin collar 204 and the intermediate section 202 depicted in FIG. 2B. The joint is sealed by longitudinally spaced pairs of O-rings 386 and 388 and 390 and 392.

Figures 9A, 9B:
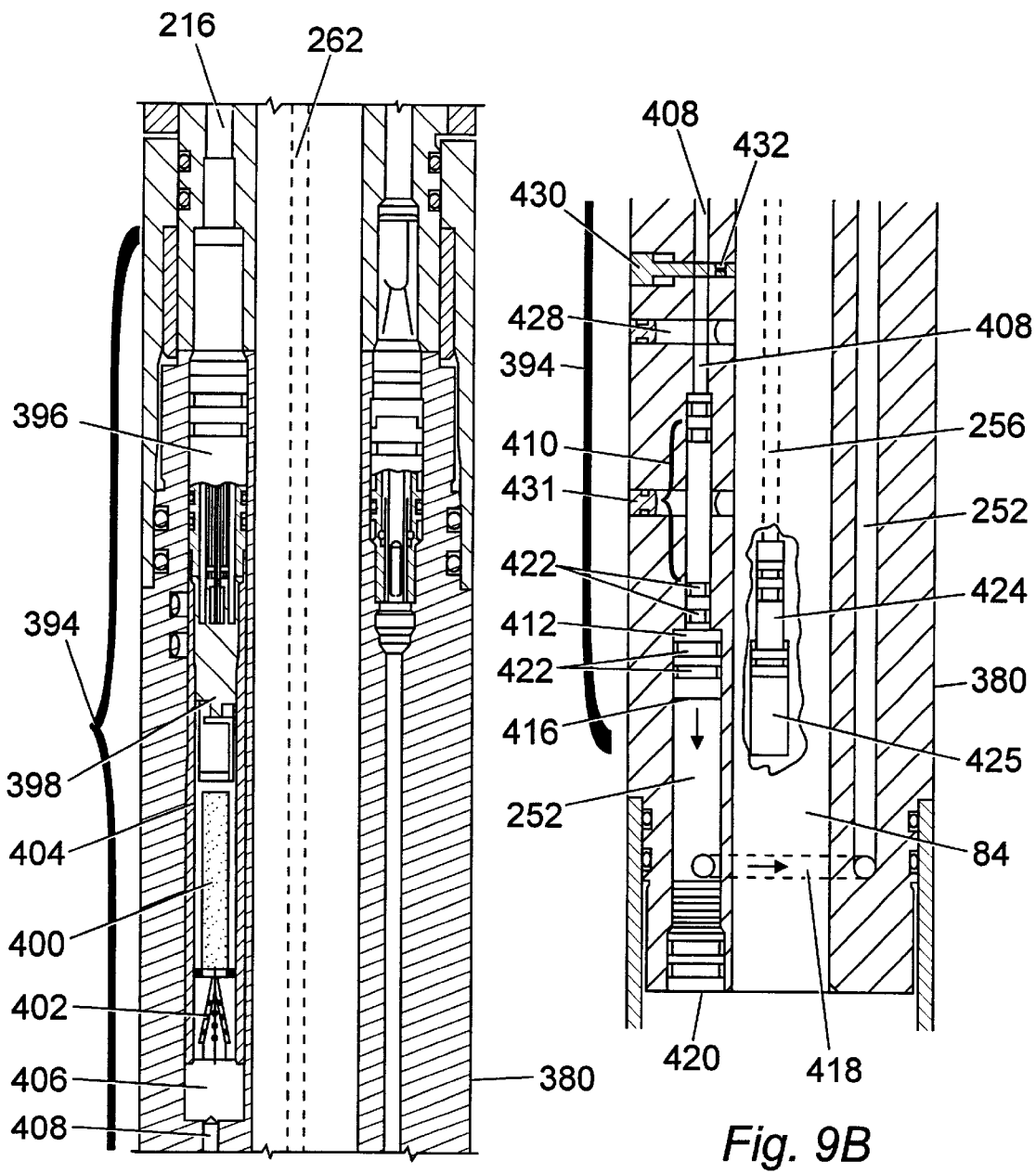
FIGS. 9A–9B are detailed sectional views of the tool showing an exemplary gas generator assembly in accordance with the present invention.

The electrical conduit 152 is connected to the upper end of a gas generator 394 that is schematically represented in FIG. 2F. The detailed structure and operation of the gas generator 394 may be understood by referring now to FIGS. 2F, 9A, and 9B. FIGS. 9A and 9B are magnified sectional views of the gas generator 394 and the surrounding intermediate housing sections 321 and 380. The gas generator 394 includes an electrical connector 396 of the type described above and designated 86 in FIG. 2A, for example. The lower end of the connector 396 is electrically connected to an electric ignitor 398. The ignitor 398 is enclosed along with a propellant charge 400 and a strainer screen 402 in a tubular housing 404. The ignitor 398, as the name implies, is designed to ignite the chemical propellant charge 400 when electrical current is supplied to the ignitor 398 via a conductor in the conduit 152. A variety of different types of commercially available electric ignitors may be used. For example, a Titan model 6000-000-150supplied by Titan Specialties, Inc. may be employed. The chemical propellant charge 400 is designed to deliver a burst of hot combustion gases through the strainer screen 402 and into a chamber 406 downstream from the strainer 402. A variety of different types of chemical propellants may be used, such as, for example, propellants based on potassium perchlorate, ammonium perchlorate, ammonium nitrate, or like materials. The strainer screen 402 is designed to readily pass the hot combustion gases into the chamber 406 while screening out uncombusted particulates which might otherwise clog the narrowed portion 408 of the chamber 406.

Downstream from the narrowed portion 408 of the chamber 406, an enlarged portion 410 is provided in which a piston 412 is slidably disposed. The backside 414 of the piston 412 is in fluid communication with the chamber 406 and the front side 416 is in fluid communication with the chamber 252. The chamber 252 crosses over to the opposite side of the intermediate section 380 via a crossover 418 shown in phantom in FIGS. 2F and 9B, and transitions through a hydraulic coupling 419 that is substantially identical to the coupling 278 shown in FIG. 5. A removable plug 420 is coupled to the intermediate section 380 to enable the chamber 252 to be filled with an initial volume of hydraulic fluid. The piston 412 is provided with a plurality of O-ring seals designated en masse as 422.

When the ignitor 398 is activated, hot gases from the propellant charge propel the piston 412 downward, boosting the pressure of the hydraulic fluid in the chamber 252. The high pressure of the hydraulic fluid propels the piston 240 shown in FIG. 2C downward, shearing the members 246. As noted above and shown generally in FIG. 2C, hydraulic fluid in the chamber 250 is permitted to vent to the chamber 256 after the piston 240 has moved to the triggered position. Fluid venting into the chamber 256 encounters a compensating piston 424 disposed in a thermal pressure compensation chamber 425 revealed in cut-away in FIG. 9B. The piston 424 may be substantially identical to the piston 412.

It should be understood that an identical gas generator 394 may be coupled to the backside of the piston 240, that is, to the chamber 250 to enable the piston 240 to be moved upward in the same manner as the piston 240 is moved downward by the activation of the gas generator 394. This may be desirable in circumstances where the gas generator 394 has unintentionally fired and moved the piston 240 downward, unlocking the collet fingers 226 and where it is necessary to retrieve the entire tool. In such circumstances it may be desirable to return the piston 240 to the locked position so that the fingers 226 do not collapse when the tool 10 is retrieved from the wellbore.

Several safety features have been incorporated into the disconnect tool 10 to enable accumulated gas pressure generated by the gas generator 394 to vent under certain conditions or to be selectively vented by the operator. These features may be understood by referring now to FIGS. 2F, 9A, and 9B. A rupture disk assembly 428 and a vent plug 430 are positioned in the intermediate section 380 above the piston 412 and ported to the bore 84. A similar rupture disk assembly 431 is positioned near the midpoint of piston 412 in the position shown in FIG. 9B. The rupture disk assemblies 428 and 431 is designed to fail and vent gas from the chamber 406 in the event the gas surpasses a preselected maximum pressure that is ordinarily less than the pressure rating of the various seals within the disconnect tool 10. In this way, if the pressure inside the chamber 406 builds to a level that approaches the failure rating of the seals, one or both of the rupture disk assemblies 428 and 431 are sacrificed to enable the high pressure liquid to vent before damaging or destroying the seals, which require much more costly and complex maintenance to replace than the rupture disk assemblies 428 and 431.

The vent plug 430 is provided to enable the operator to manually vent built up pressure in the chamber 406 directly into the bore 84 by screwing the plug 430 in until the O-ring seal 432 in the plug 430 clears into the bore 84. This may be desirable in circumstances where the gas generator 394 has been activated and there is residual high pressure in the chamber 252. The operator may selectively vent that high pressure into the bore 84 under controlled conditions at the surface.

Figure 10:
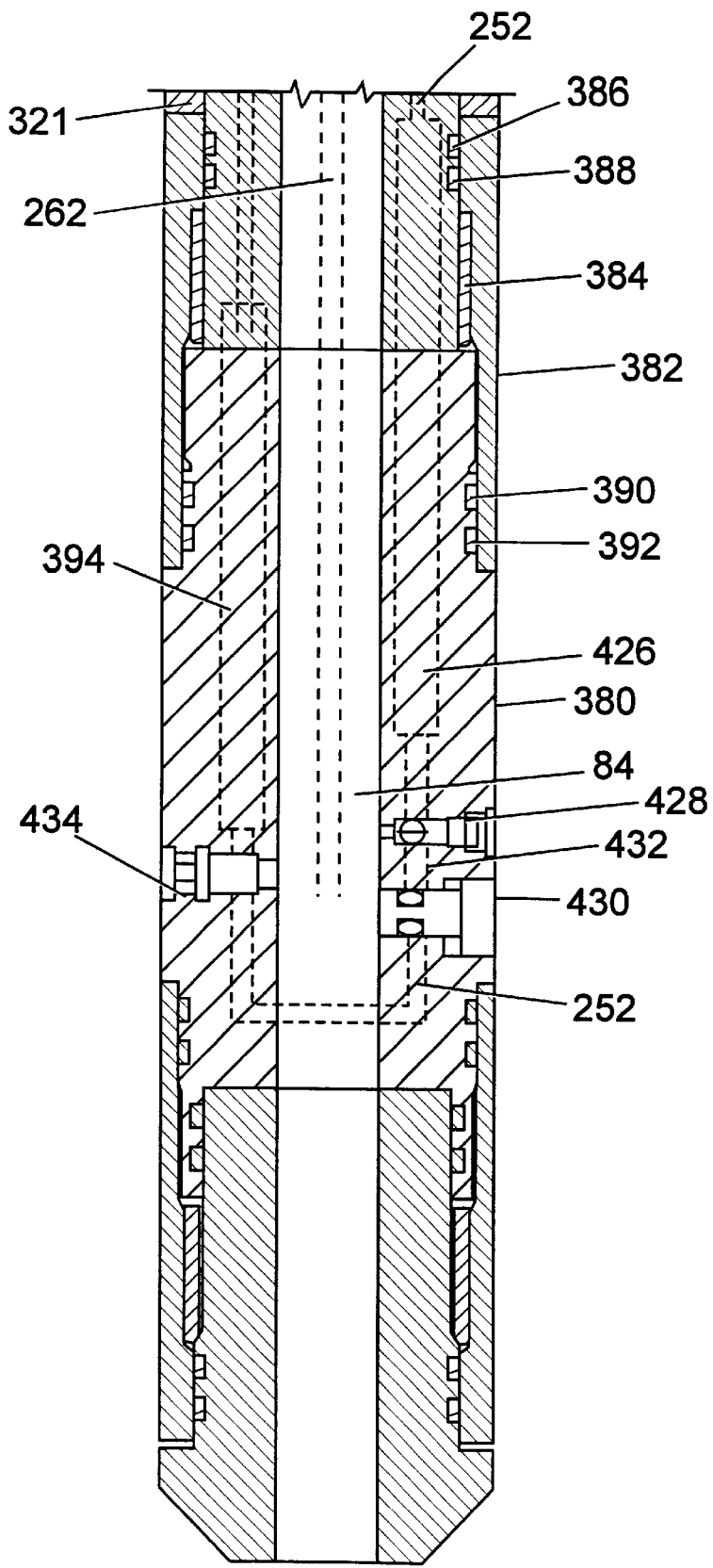
FIG. 10 is a sectional view like FIG. 2F, but showing a different rotation.

Referring now to FIG. 10, which is a view similar to, but out of rotation from FIG. 2F, a rupture disk assembly 434 may be provided in the intermediate section 380 and configured to fail when the pressure of the working fluid in the bore 84 exceeds a preselected maximum and thereby permit the high pressure working fluid to vent into the wellbore.

Referring again to FIG. 2F, the lower end of the intermediate section 380 is threadedly coupled to a bottom section 436 via an intermediate section 438 and a spin collar 440 secured in an identical fashion to the spin collar 384 and intermediate section 382 also depicted in FIG. 2F, albeit in a flip-flopped orientation relative to the section 382 and the collar 384. The bottom section 436 includes an upwardly disposed reduced diameter portion that defines an upwardly facing annular shoulder 442 that abuts the lower end of the intermediate section 436. The overall joint is sealed by respective sets of O-ring seals 444, 446, and 448. The connection between the bottom section 436 and the other downhole tool 22 shown in FIG. 1 is not shown in FIG. 2F, but may be a standard pin/box connection or other suitable threaded connection for a working string.

Figure 11:
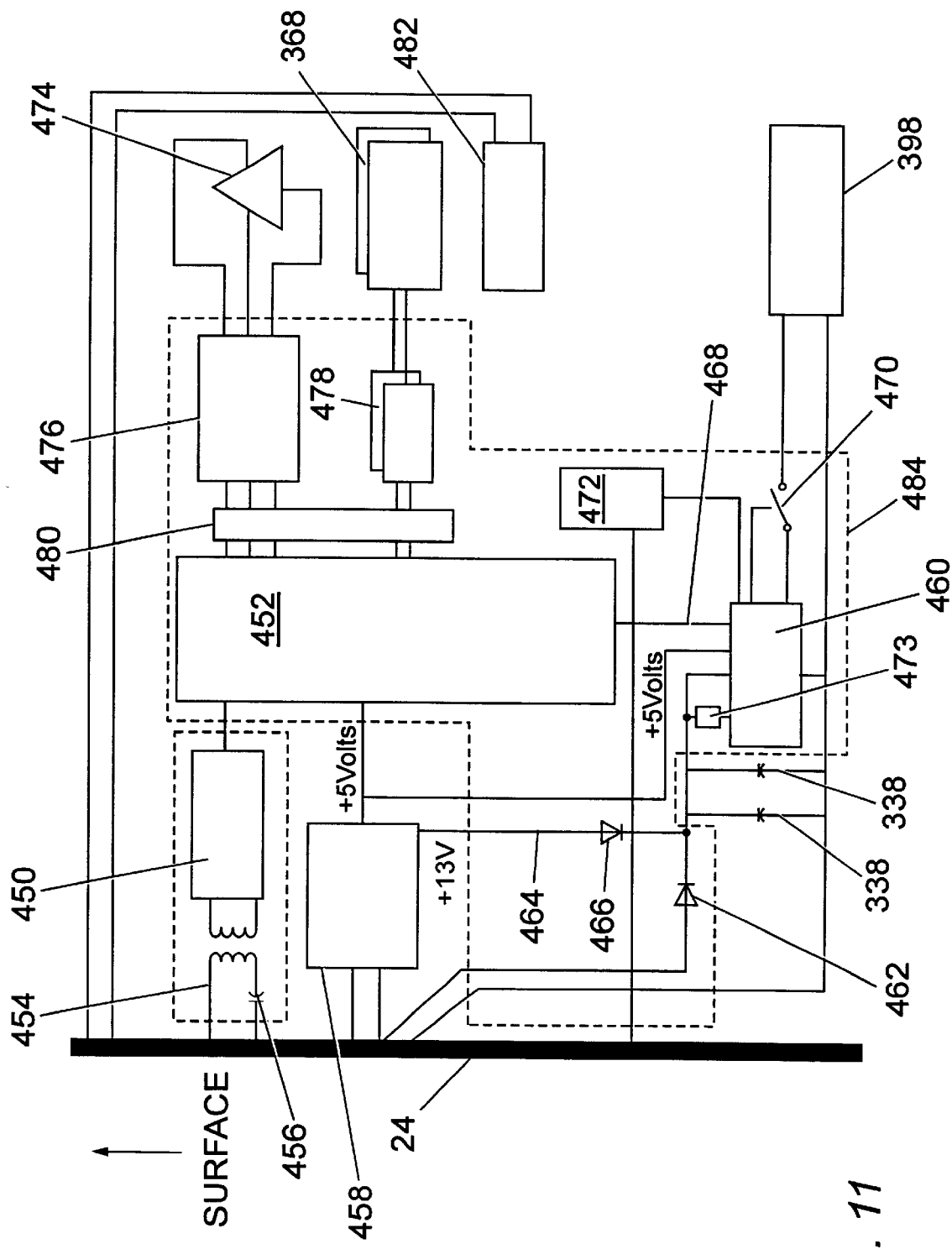
FIG. 11 is a block diagram of the internal circuitry of the tool in accordance with the present invention.
Figure 12:
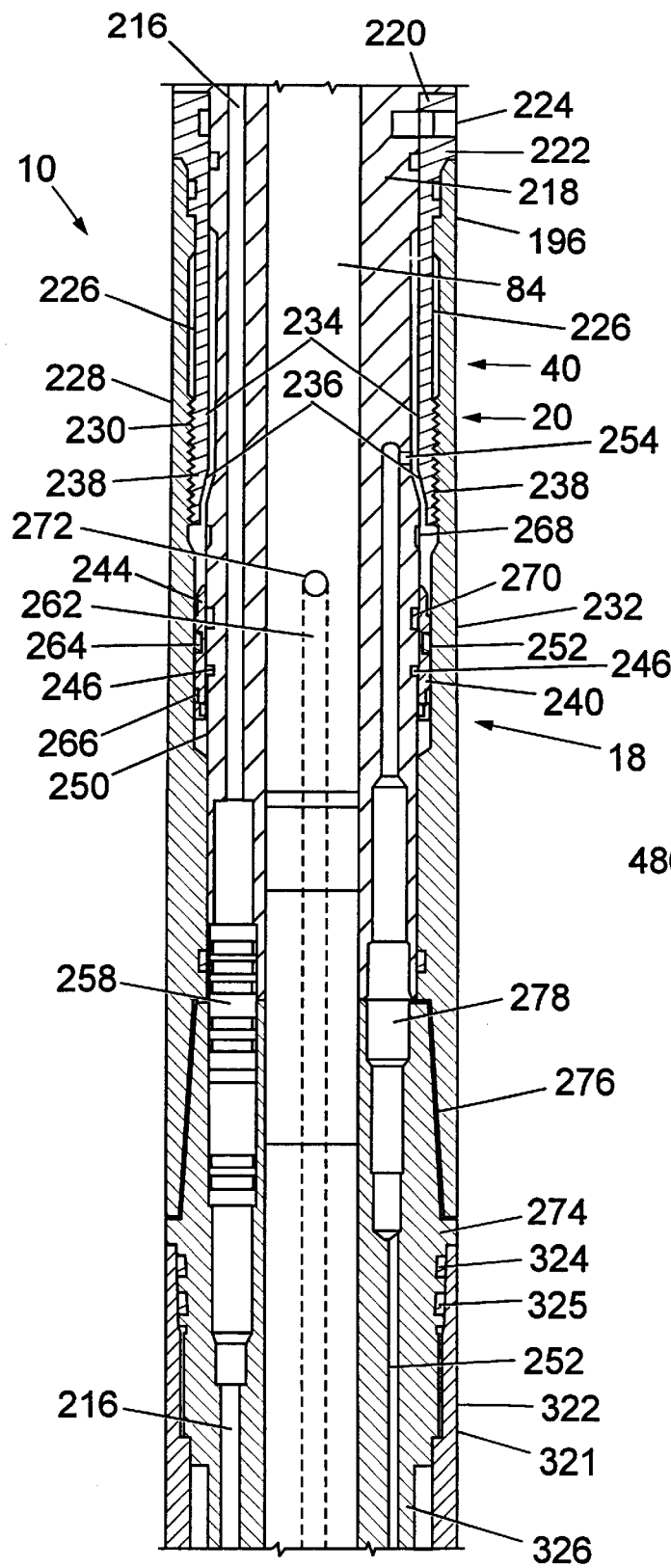
FIG. 12 is a sectional view like FIG. 2C depicting triggering piston in the triggered position.

The internal circuitry for the disconnect tool 10 may be understood by referring now to FIG. 11, which is a block diagram of the internal circuitry, and to FIGS. 1, 2D, 2E, and 2F. A communications interface 450 is provided to transfer signals between the controller 36 and an onboard controller 452 using the aforementioned SEGNET downhole communications protocol. The communications interface 450 is electrically coupled to the wireline 24 by a transformer 454 and a capacitor 456. A preregulator and DC—DC converter 458 is provided to receive high voltage DC power from the wireline 24. The converter 458 provides a +5V output to the controller 452 and an ignitor controller 460. The voltage loss in the wireline conductor 24 will depend upon a variety of factors, such as the size and configuration of the surface power supply and the actual configuration of the wireline itself 24. In an exemplary embodiment, DC voltage is supplied at +250V. High voltage is supplied from the wireline 24 to the storage capacitors 338 through a diode 462. A +13V output from the convertor 458 is also provided to establish an alternate way of charging the capacitors 338. The +13V output is connected to a conductor 464 that is provided with a diode 466. There will be some voltage drop across the diode 466. The capacitors 338 are continuously charged when power is supplied to the wireline 24, and as noted above, provide a backup power supply to power the ignitor 398 in the event that power is lost from the wireline 24.

The ignitor controller 460 is designed to operate in a stand alone mode and respond to a loss of power from the wireline 24, or be operated in a slave mode and receive commands from the controller 452 via a command/status bus 468. If power is present in the wireline 24, the igniter controller 460 provides status signals, such as signals representing an armed or disarmed condition of the ignitor 398 to the controller 452 via the command status bus 468. When given a command to fire the ignitor from the controller 36, the ignitor controller closes a switch 470, enabling current to flow through the ignitor 398. The switch 470 may be a solid state switch or an electromechanical switch. The ignitor controller 460 may be programmed to close the switch 470 immediately after receipt of a fire command from the controller 36. Alternatively, the controller 460 may be programmed to initiate a time delay, that is, close the switch 470 after a preselected period of time. The controller 460 may also be programmed to fire the ignitor 398 in the event that main power is lost from the wireline 24. The time delay feature may be advantageously employed in this circumstance to provide operators with a time cushion in which to reestablish power to the wireline 24. A power loss by the wireline conductor 24 is sensed by a low voltage detector 472 that is connected to the ignitor controller 460 and to the wireline 24. A second low voltage detector 473 is connected the capacitors 338 to detect a low voltage condition therein so that the time delay may be expedited before the capacitor voltage falls below a desired level.

The strain gauges 352, 354, and 356 shown in FIG. 2E are represented schematically in FIG. 11 by the triangle 474. The outputs of the strain gauges 474 are connected to a strain gauge signal filter 476. The output of the temperature/pressure sensors 368A, 368B, and 368C are connected to a signal scaler 478 which is designed to enable the controller 452 to interpret a full scale output from the sensors 368A, 368B, and 368C as a full scale input, and thus, a full scale reading. The outputs of the strain gauge signal filter 476 and the signal scaler 478 are connected to an analog-to-digital convertor 480. The digital outputs of the A to D convertor 480 are transmitted to the controller 452. Data transmitted from the strain gauges 474, and/or the temperature/pressure sensors 368A, 368B, and 368C is transferred to the controller 36 by the controller 452 via the communications interface 450. The casing collar locator coil 335 may be coupled to the controller 36 directly through the wireline 24 as shown in FIG. 11 or, alternatively, may be interfaced with the controller 452 as desired.

The arrangement of the various internal electronic components for the tool 10 is largely a matter of design discretion. For example, the communications interface 450 and the transformer 454 may be implemented on the circuit board 340 shown in FIG. 2D, and the DC—DC convertor 458 may be implemented on the circuit board 342, also shown in FIG. 2D), and the remainder of the circuitry shown in FIG. 11 and circumscribed by the dashed box 484 may be mounted on the circuit board 344 shown in FIG. 2E.

The disconnect operation of the tool 10 may be understood by referring now to FIGS. 1, 2C, 2F, 9A, 9B, and FIG. 12. FIG. 11 is a sectional view like FIG. 2C, but shows the piston 240 in the triggered position. As noted above, the disconnect sequence may be initiated manually by instructing the controller 36 to send a command to the ignitor controller 460 or by default in the event that a low voltage condition signifying a main power loss is sensed by the low voltage detector 472. The first scenario will now be illustrated. A command to activate the ignitor 398 is sent from the controller 36 to the controller 452. The controller 452 passes the command to the 460, which, in turn closes the switch 470 after the preprogrammed time delay, if any, enabling current to pass through the ignitor 398. The ignitor 398 ignites the propellant charge 400. The discharge of hot gases into the chamber 406 propels the piston 412 downward, boosting the pressure of hydraulic fluid in the chamber 252. The high hydraulic pressure moves the piston 240 downward, shearing the members 246 and causing the piston 240 to stop in the triggered position shown in FIG. 12. Although the piston 240 no longer prevents inward bending of the collet fingers 226, the lingers 226 do not automatically bend inward. Rather, the fingers 226 are dimensioned and the engaging teeth 228 and 230 of the fingers 226 and the interior surface of the intermediate section are configured so that the fingers 226 will collapse inwardly only if a preselected axial load applied to the tool 10 is exceeded. The joint at 20 may be disengaged by applying an axial thrust on the segment 16 that exceeds the preselected maximum. If however, it is desired to withdraw the tool 10 without disconnecting the joint at 20, the tool 10 may be withdrawn while care is taken to maintain the axial load below the preselected maximum. This type of extraction may be desirable in circumstances where the gas generator has unintentionally fired and triggered the piston 240.

In the default activation mode, the ignitor controller 460 will close the switch 470 upon detection of a low voltage condition signifying a loss of main power from the wireline 24. This may be instantaneous or after any preprogrammed time delay. If main power is restored to the wireline 24 during the time delay, the igniter controller 460 will cancel the time delay and reset to its normal state. If the operator desires to cancel the firing sequence, a command may be sent from the controller 36 canceling the firing instruction. If no such cancellation command is received, and the time delay has expired, the ignitor controller 460 closes the switch 470 and the ignitor 398 fires, triggering the piston 240 as described above.

Figure 13:
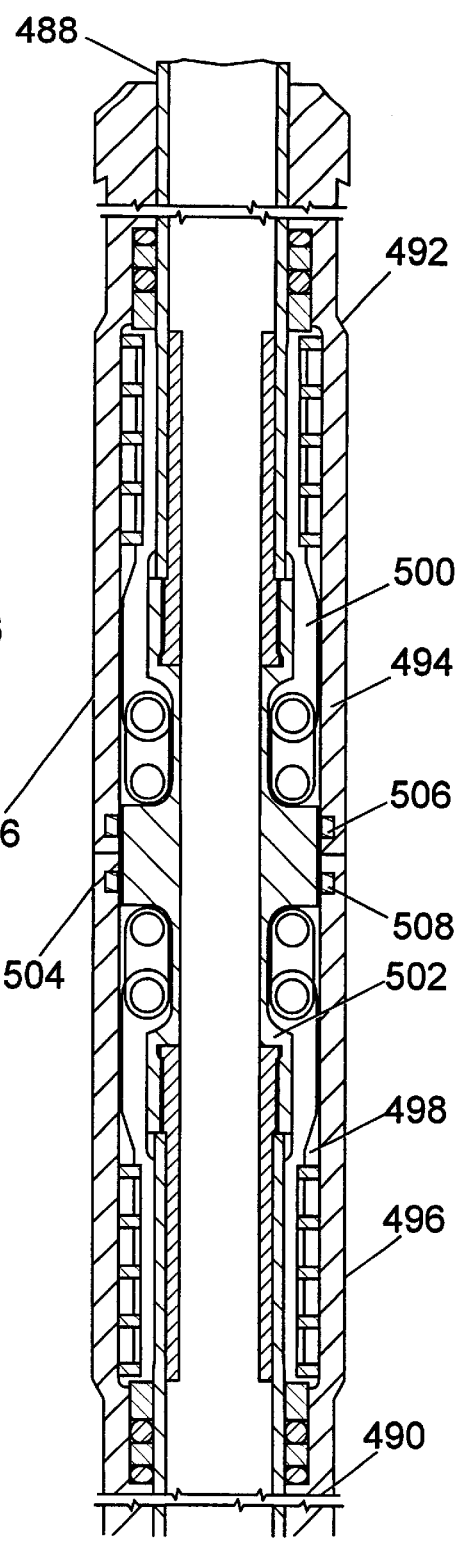
FIG. 13 is a sectional view of an exemplary embodiment of a coiled tubing-to-coiled tubing coupling in accordance with the present invention.

Referring now to FIG. 13, the structure and function of the coiled tubing coupling 48 depicted in FIG. 2A may be implemented in a coupling 486 for connecting first and second ends 488 and 490 of tubular members, such as the coiled tubing shown. The coupling 486 includes a tubular housing 492 consisting of a upper section 494 and a lower section 496. The sections 494 and 496 cooperatively define a longitudinal bore 498 in which a first collet 500 is positioned to engage the first end 488 of coiled tubing and a second collet 502 is positioned to engage the end 490 of coiled tubing. The collets 500 and 502 may be formed as a integral member and the sections threadedly attached thereto at 504. Alternatively, the collets 500 and 502 may be disposed in the housing 492 as separate members separated by an externally threaded spacer (not shown) upon which the sections 494 and 496 may be threadedly engaged. O-rings 506 and 508 respectively seal the sections 494 and 496 against the leakage of fluid proximate the joint between the two sections 494 and 496. In other structural and functional aspects, the collets 500 and 502 are substantially identical to the arrangement of the collet 52 and the annular members 80 described above and depicted in FIG. 2A.

Figure 14:
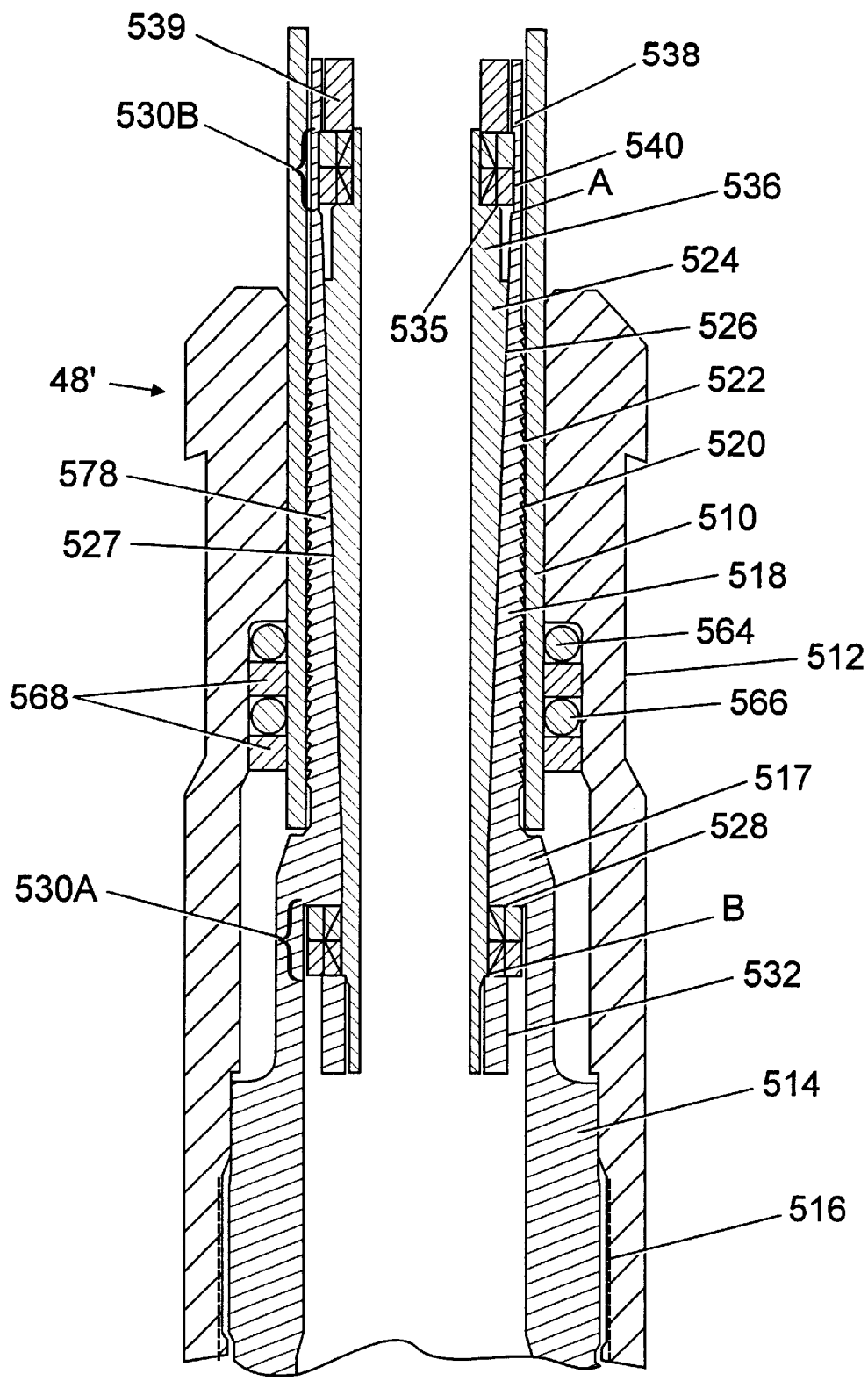
FIG. 14 is a sectional view of an alternate arrangement for a coiled tubing coupling in accordance with the present invention.

Another arrangement for collet-like engagement to the tubular member 14 shown in FIG. 2A or the members 488 and 490 shown in FIG. 13 is depicted in FIG. 14. FIG. 14 is a sectional view like FIG. 2A and depicts a coupling now designated 48', for coupling to a tubular member, such as an end 510 of coiled tubing. In this embodiment a tubular housing 512 encloses the upper portion of an intermediate housing section 514. The housing 512 is threadedly coupled to the section 514 at 516. The end 510 of the tubular member is disposed in the housing 512. A collet 517 is integrally formed with the section 514 and includes a plurality of longitudinally projecting and peripherally spaced fingers 518 that project into the end 510 and are moveable radially. Each of the fingers 518 is provided with at least one and advantageously a plurality of outwardly projecting members or teeth 520 to engage the interior surface 522 of the end 510. The fingers 518 have a tapered or fluted internal surface that tapers inwardly, that is, presents a decreasing internal diameter from point A downward to point B. A tapered tubular insert 524 is positioned inside the fingers 518. The insert 524 has a tapered outer surface 527 that matches the taper of the fingers 518 and establishes a wedging action therewith when the fingers 518 are moved longitudinally relative to the insert 524 and vice versa. The lower ends of the fingers 518 are expanded to define a downwardly facing annular shoulder 528 A shrink assembly 530A is abutted against the annular shoulder 528 by a spin collar 532 threaded to the exterior of the lower end 534 of the insert 524. An identical shrink ring assembly 530B is seated on an upwardly facing annular shoulder 535 of the upper end 536 of the insert 524. The upper ends 538 of the fingers 518 includes a shallow internal groove 540 in which the outer diameter of the shrink ring assembly 535 is seated. A spin collar 539 is threaded to interior of the upper ends 538 of the fingers 518.

Figure 15:
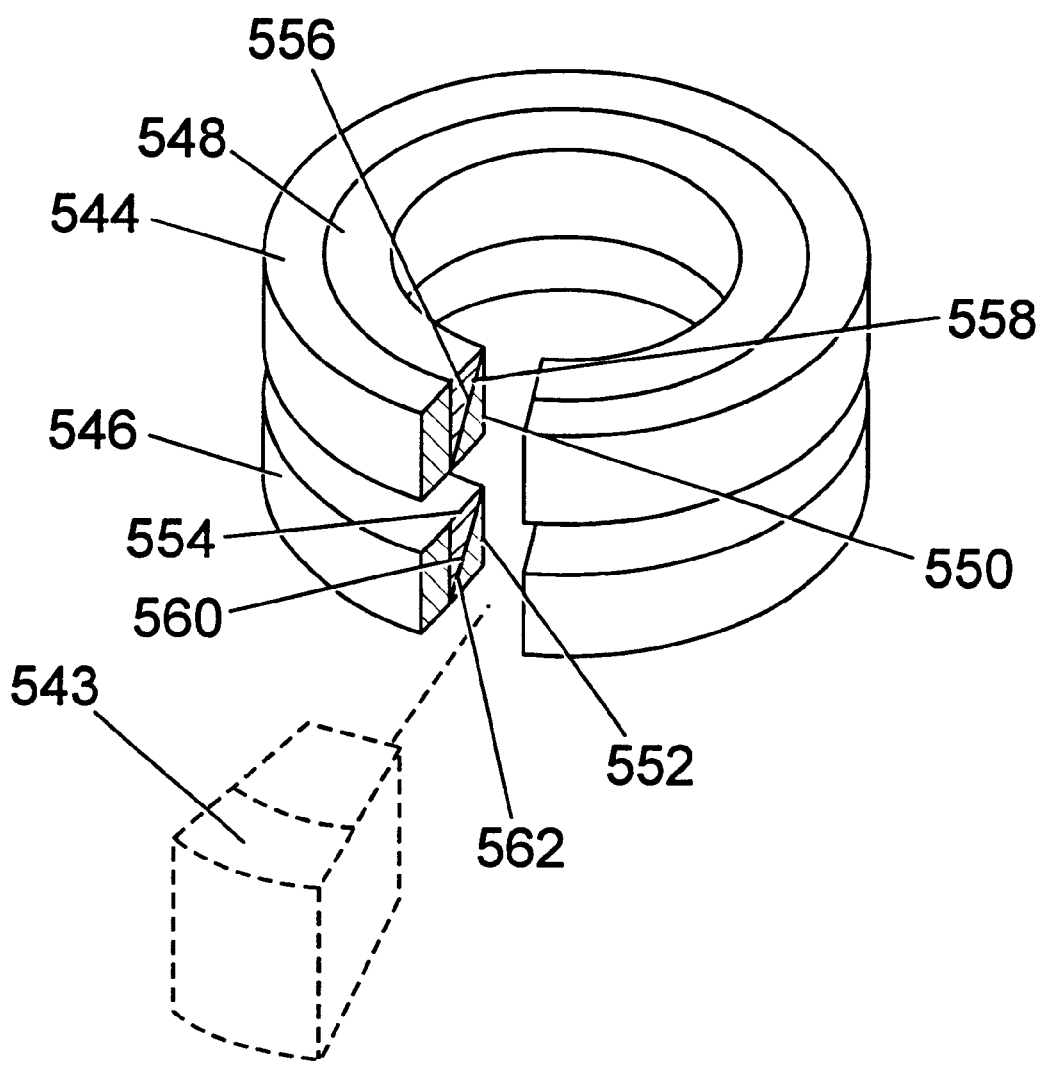
FIG. 15 is a pictorial view of the shrink ring assemblies depicted in FIG. 14 in accordance with the present invention.

The detailed structure of the shrink ring assemblies 530A and 530B may be understood by referring now also to FIG. 15, which is a pictorial of the shrink ring assembly 530B with a wedge shaped portion 543 exploded away in phantom to reveal the internal structure. The structure of the assembly 530B is exemplary of the assembly 530B. The assembly 530A includes a pair of shrink rings 544 and 546. A pair of annular wedges 548 and 550 are positioned inside the shrink ring 544 and an identical pair of annular wedges 552 and 554 are positioned inside the shrink ring 546. The annular wedges 548 and 550 are provided with cooperating tapered surfaces 556 and 558 and the wedges 552 and 554 are provided with cooperating tapered surfaces 560 and 562. When the ring 544 shrinks in diameter, the annular wedge 548 is squeezed against the annular wedge 550 and thrust upward as a result of the wedging action of the engaging surfaces 556 and 558. The upward thrust acts against the spin collar 539. Similarly, when the ring 546 shrinks, the annular wedge 554 is squeezed against the annular wedge 556 and thrust downward as a result of the wedging action of the engaging surfaces 560 and 562. The downward thrust acts on the insert 524. In like fashion, the shrink ring assembly 530A exerts an upward thrust on the fingers 518. The combined downward thrust on the insert 524 and upward thrust on the fingers 518 wedges the fingers outward, establishing a secure engagement with the interior 522 of the end 510. The connection may be further enhanced by torquing the spin collars 532 and 539 and locking them in place via crimp rings, snap rings, or the like.

The shrinking action of the rings 544 and 546 is advantageously provided by fabricating the rings 544 and 546 from a shape-memory material of the types described above. In situ heating will shrink the rings 544 and 546 and tighten the connection.

A fluid seal between the end 510 and the housing 512 is provided by space O-rings 564 and 566 separated by annular spacers 568.

Other suitable mechanisms may be incorporated to selectively move the piston 412. For example, as shown in FIG. 2F, the gas generator 394 may be replaced with a linear electric motor, shown schematically and exploded at 570. The motor 570 may be coupled to the piston 412 and powered via a conductor in the conduit 152.

Figure 16:
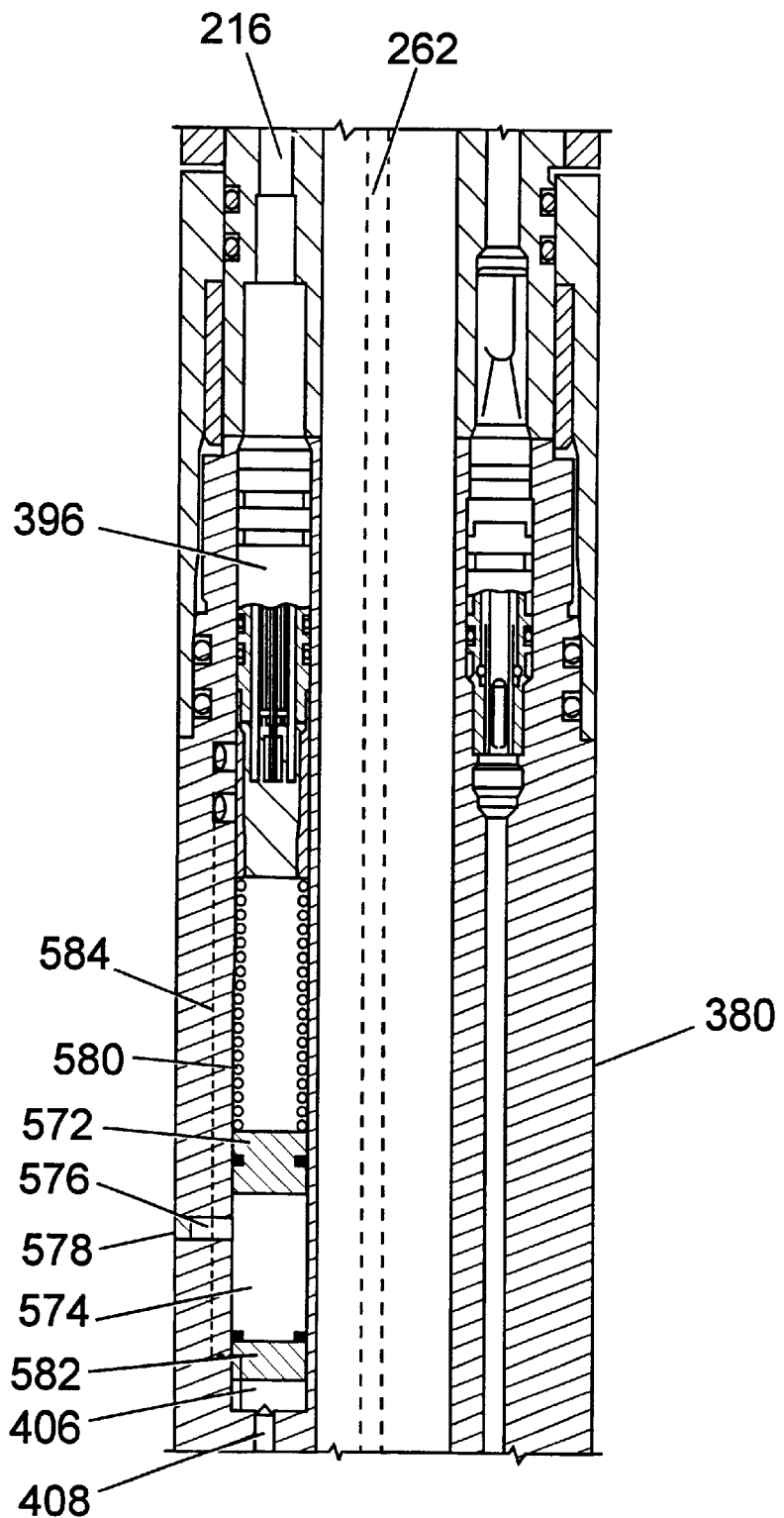
FIG. 16 is a sectional view like FIG. 21; depicting an alternate arrangement for a gas generator in accordance with the present invention.

In another alternate embodiment depicted in FIG. 16, the pressure to move the piston 412 is generated by an accumulator arrangement. FIG. 16 is a view like FIG. 9A. A piston 572 is slidably disposed in a chamber 574 that is filled with a high pressure charge of fluid at the surface via the port 576 that has a zero-leak check valve (not shown) and is later plugged by the plug 578. As the chamber 574 fills, the piston 572 moves upward, resisted by a spring 580. The spring 580 enables a high pressure charge to be filled. To release the fluid in the chamber, a solenoid valve 582 coupled to the connector 396 via a conductor 584 shown in phantom and is activated in the same way as the gas generator 394 described above. The fluid is released into the chamber 406.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A coupling for connecting to an end of a member, comprising:
    a housing having a longitudinal bore for receiving the end of the member;
    a collet coupled to the housing and disposed in the bore, the collet having a plurality of bendable fingers, and each of the fingers including a projecting tooth to engage the end of the member; and
    an annular member positioned around the plurality of fingers and being composed of a shape-memory material, the annular member being deformable in situ from a temporary shape to a permanent shape in which the annular member squeezes the plurality of fingers into engagement with the end of the member, and
    wherein the tooth is outwardly projecting to engage an interior of the end of the member.

2. A coupling for connecting to an end of a member, comprising:
    a housing having a longitudinal bore for receiving the end of the member;
    a collet coupled to the housing and disposed in the bore, the collet having a plurality of bendable fingers to engage the end of the member; and
    an annular member positioned around the plurality of fingers and being composed of a shape-memory material, the annular member being deformable in situ from a temporary shape to a permanent shape in which the annular member squeezes the plurality of fingers into engagement with the end of the member, and
    wherein each of the fingers is pivotally coupled to the collet.

3. A coupling for connecting to an end of a member, comprising:
    a housing having a longitudinal bore for receiving the end of the member;
    a collet coupled to the housing and disposed in the bore, the collet having a plurality of bendable fingers to engage the end of the member; and
    a plurality of annular members disposed in longitudinally spaced-apart relation around the plurality of fingers and being composed of a shape-memory material, the annular members being deformable in situ from a temporary shape to a permanent shape in which the annular members squeeze the plurality of fingers into engagement with the end of the member.

4. A coupling for connecting to an end of a member, comprising:
    a housing having a longitudinal bore for receiving the end of the member;
    a collet coupled to the housing and disposed in the bore, the collet having a plurality of bendable fingers to engage the end of the member; and
    an annular member positioned around the plurality of fingers and being composed of a shape-memory material, the annular member being deformable in situ from a temporary shape to a permanent shape in which the annular member squeezes the plurality of fingers into engagement with the end of the member, and
    wherein the shape-memory material comprises nitinol.

5. A coupling for connecting first and second ends of first and second tubular members, comprising:
    a housing having a longitudinal bore for receiving the first and second ends of the first and second tubular members;
    a first collet coupled to the housing and disposed in the bore, the first collet having a first plurality of bendable fingers to engage the exterior of the first end of the first tubular member;
    a first annular member positioned around the first plurality of fingers;
    a second collet coupled to the housing and disposed in the bore, the second collet having a second plurality of bendable fingers to engage the exterior of the second end of the second tubular member; and
    a second annular member positioned around the second plurality of fingers, the first and second annular members being composed of a shape-memory material and being deformable in situ from a temporary shape to a permanent shape in which the first and second annular members respectively squeeze the first and second plurality of fingers into respective engagement with the first and second ends of the first and second tubular members.

6. The coupling of claim 5, wherein each of the first plurality of fingers comprises a first projecting tooth and each of the second plurality of fingers comprises a second projecting tooth.

7. The coupling of claim 6, wherein the first and second teeth are inwardly projecting to respectively engage the exterior of the first end of the first tubular member and the exterior of the second end of the second tubular member.

8. The coupling of claim 6, wherein the first and second teeth are outwardly projecting to respectively engage the interior of the first end of the first tubular member and the interior of the second end of the second tubular member.

9. The coupling of claim 5, wherein each of the first plurality of fingers is pivotally coupled to the first collet and each of the second plurality of fingers is pivotally coupled to the second collet.

10. The coupling of claim 5, comprising a first plurality of the first annular members disposed in longitudinally spaced-apart relation and a second plurality of the second annular members disposed in longitudinally spaced-apart relation.

11. The coupling of claim 5, comprising a third tubular member coupled to the housing and a fourth tubular member coupled to the housing, a portion of the third tubular member having an outer diameter dimensioned to be slidably received in the first end of the first tubular member and a portion of the fourth tubular member having an outer diameter dimensioned to be slidably received in the second end of the second tubular member.

12. The coupling of claim 5, wherein the shape-memory material comprises nitinol.

13. A connector for coupling to an end of a downhole conductor cable, comprising:

a housing having a longitudinal bore for receiving the end of the downhole conductor cable;

a collet coupled to the housing and disposed in the bore, the collet having a plurality of bendable fingers to engage the exterior of the end of the downhole conductor cable; and an annular member positioned around the plurality of fingers and being composed of a shape-memory material, the annular member being deformable in situ from a temporary shape to a permanent shape in which the annular member squeezes the plurality of fingers into engagement with the end of the downhole conductor cable, and wherein each of the fingers is pivotally coupled to the collet.

14. A connector for coupling to an end of a downhole conductor cable, comprising:

a housing having a longitudinal bore for receiving the end of the downhole conductor cable;

a collet coupled to the housing and disposed in the bore, the collet having a plurality of bendable fingers to engage the exterior of the end of the downhole conductor cable; and a plurality of annular members disposed in longitudinally spaced-apart relation around the plurality of fingers and being composed of a shape-memory material, the annular members being deformable in situ from a temporary shape to a permanent shape in which the annular members squeeze the plurality of fingers into engagement with the end of the downhole conductor cable.

15. A connector for coupling to an end of a downhole conductor cable, comprising:

a housing having a longitudinal bore for receiving the end of the downhole conductor cable;

a collet coupled to the housing and disposed in the bore, the collet having a plurality of bendable fingers to engage the exterior of the end of the downhole conductor cable; and an annular member positioned around the plurality of fingers and being composed of a shape-memory material, the annular member being deformable in situ from a temporary shape to a permanent shape in which the annular member squeezes the plurality of fingers into engagement with the end of the downhole conductor cable, and wherein the shape-memory material comprises nitinol.

* * * * *